United States Patent

Ghosh et al.

[11] Patent Number: 6,108,226
[45] Date of Patent: *Aug. 22, 2000

[54] VOLTAGE SELECTION APPARATUS AND METHODS

[76] Inventors: Ramit Ghosh, 17 Anamosa Ct., Rockville, Md. 20855; Mark E. Besmen, 2622 Blueridge Ave., Wheaton, Md. 20902

[*] Notice: This patent is subject to a terminal disclaimer.

[21] Appl. No.: 09/033,823

[22] Filed: Mar. 3, 1998

Related U.S. Application Data

[63] Continuation-in-part of application No. 08/669,593, Jun. 24, 1996, Pat. No. 5,726,561.

[51] Int. Cl.[7] ............................... H02M 1/10; G05F 1/14
[52] U.S. Cl. ............................................ 363/142; 323/255
[58] Field of Search ................................. 323/235, 239, 323/241, 319, 322, 901, 908, 255, 237, 320; 363/142

[56] References Cited

U.S. PATENT DOCUMENTS

| | | | |
|---|---|---|---|
| 3,787,756 | 1/1974 | Berger | 363/53 |
| 4,419,619 | 12/1983 | Jindrick et al. | 323/257 |
| 4,623,834 | 11/1986 | Klingbiel et al. | 323/258 |
| 4,686,375 | 8/1987 | Gottfried | 290/2 |
| 4,709,318 | 11/1987 | Gephart et al. | 363/37 |
| 4,860,145 | 8/1989 | Klingbiel | 361/18 |
| 5,216,352 | 6/1993 | Studtmann et al. | 323/241 |
| 5,268,631 | 12/1993 | Gorman et al. | 323/246 |
| 5,289,110 | 2/1994 | Slevinsky | 323/301 |
| 5,327,355 | 7/1994 | Chiba et al. | 364/483 |
| 5,365,421 | 11/1994 | Eastman | 363/71 |
| 5,434,768 | 7/1995 | Jitaru et al. | 363/21 |
| 5,604,423 | 2/1997 | Degeneff et al. | 323/258 |
| 5,726,561 | 3/1998 | Ghosh et al. | 323/255 |
| 5,814,966 | 9/1998 | Williamson et al. | 318/798 |

*Primary Examiner*—Adolf Deneke Berhane
*Attorney, Agent, or Firm*—Oldham & Oldham Co., L.P.A.

[57] ABSTRACT

The apparatus and methods of the invention provide conversion of a wide range of utility voltages found worldwide, to a fixed nominal voltage level. The invention therefore provides the ability to "plug in" to virtually any power source, and produce a desired nominal voltage for operation of electrical equipment either alone or in conjunction with a UPS device. The voltage selection apparatus provides standard nominal levels of electrical power to equipment while utilizing power sources of varying voltage and frequency. The device is dynamically adaptive to the input power source, and maintains its output within a nominal range even where the input source varies to a substantial degree. The voltage selection apparatus comprises an input for receiving input AC voltage from a power source, and a transformer to produce an output voltage which is coupled to the input. The transformer has at least one winding and a predetermined plurality of winding taps used to achieve a desired nominal output voltage from the transformer. A voltage detector is coupled between the input and the transformer to selectively measure the input voltage and enable output of a selected nominal output voltage. A control circuit monitors the input voltage to produce control signals in response thereto, and relay devices are controlled to select a predetermined winding tap based upon the input voltage to produce an output from the transformer within a desired nominal voltage range.

16 Claims, 19 Drawing Sheets

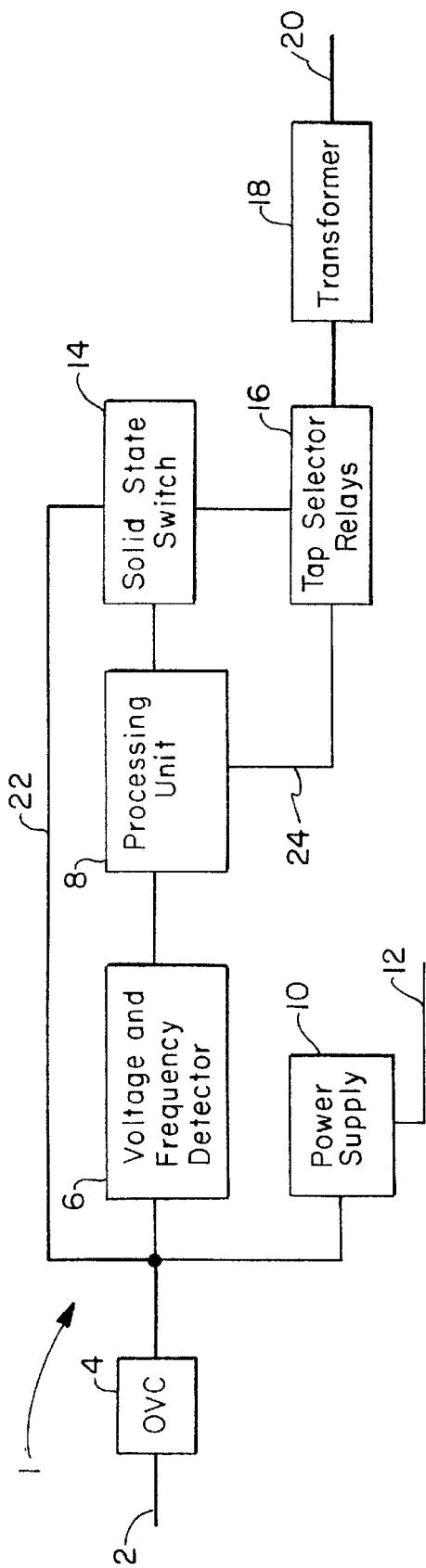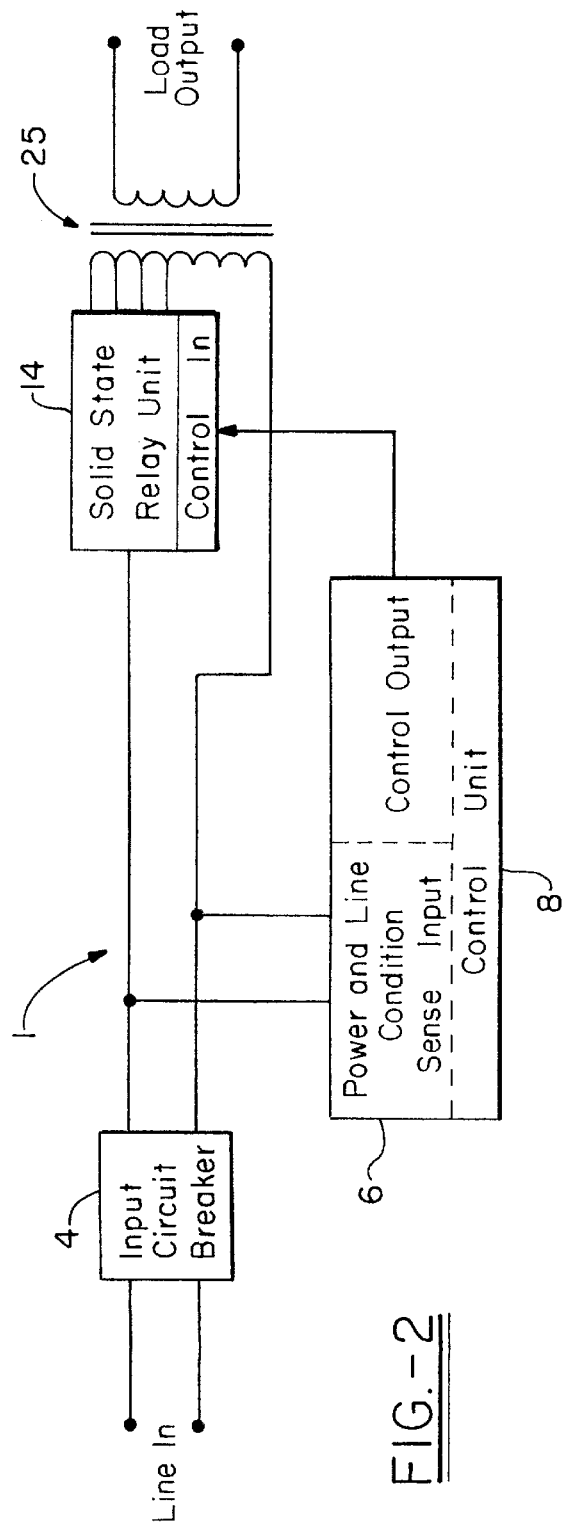
FIG.-1
FIG.-2

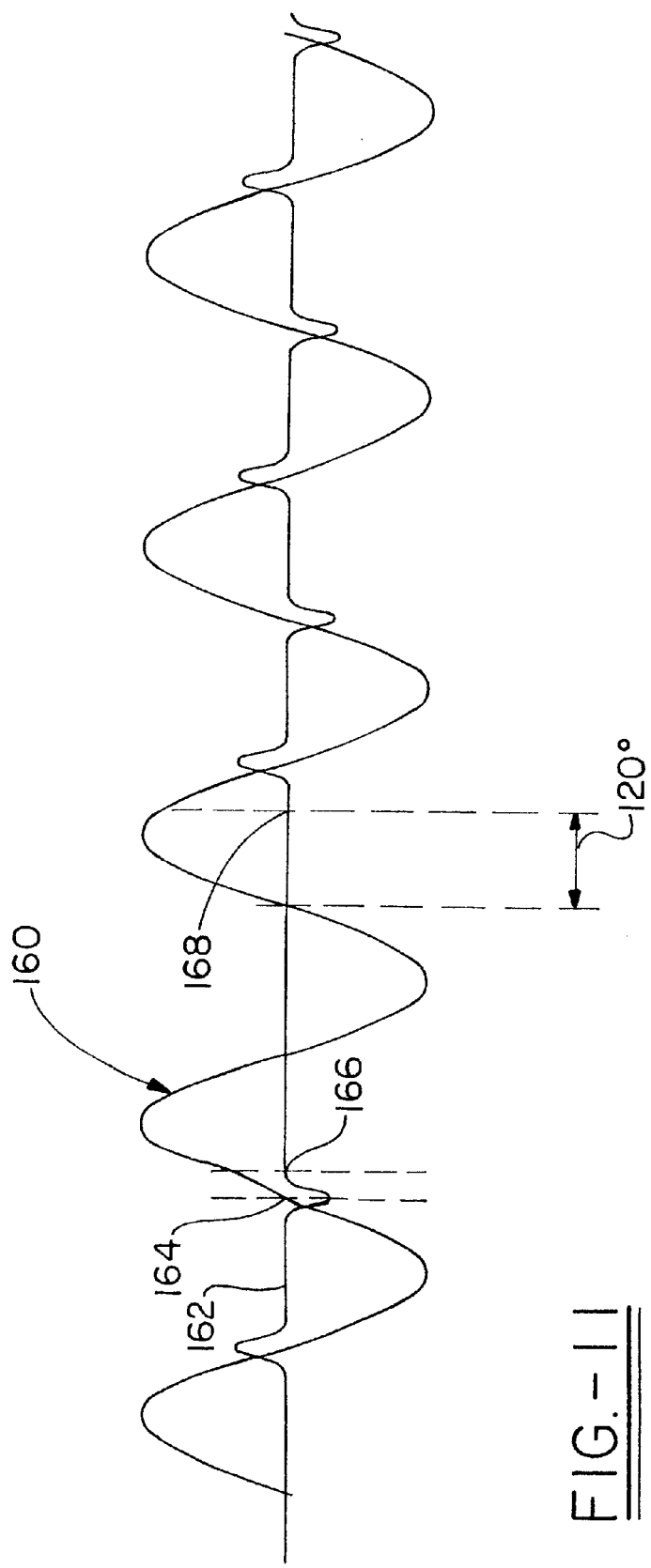

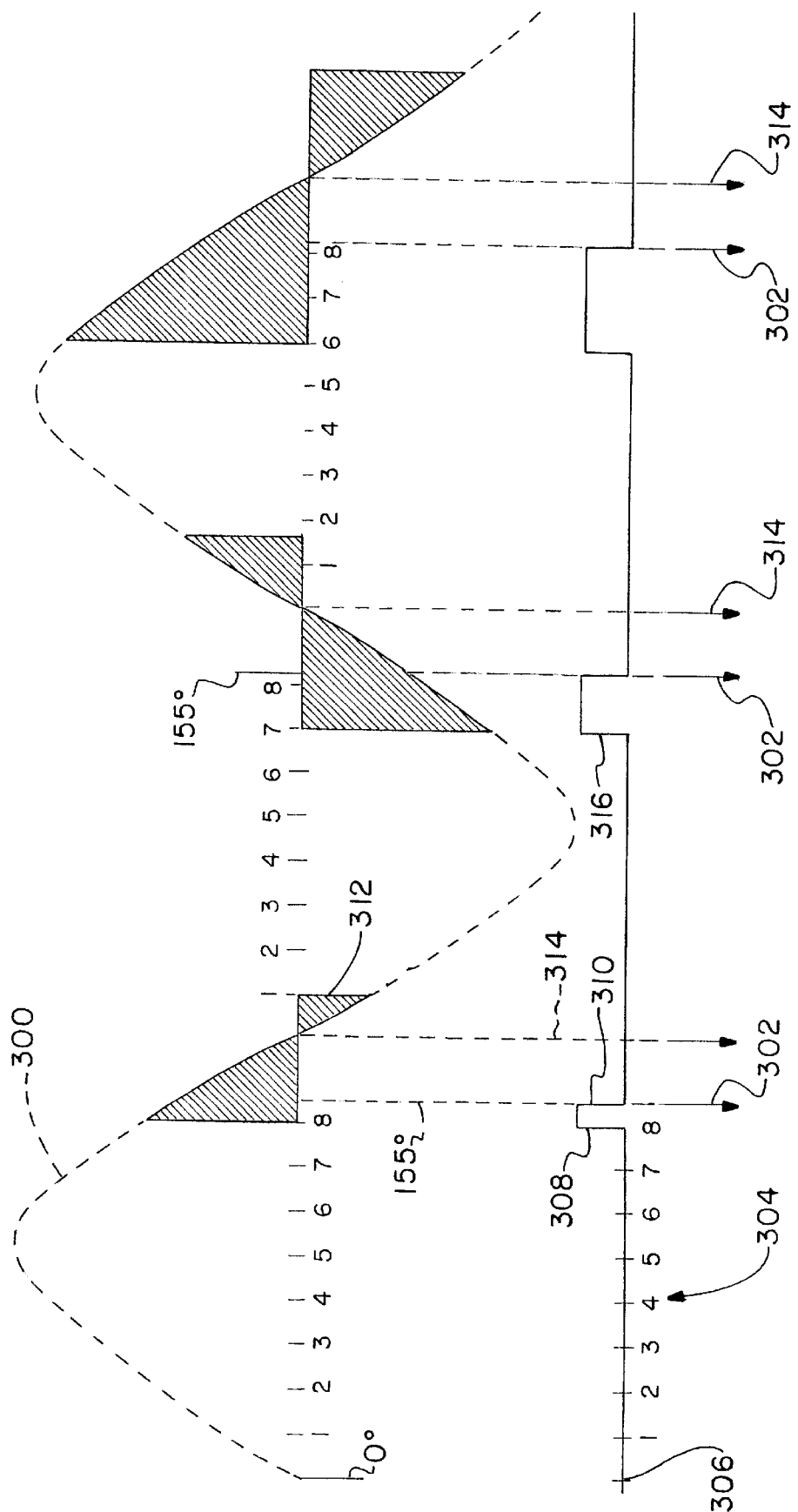

VOLTAGE SELECTION APPARATUS AND METHODS

This is a continuation-in-part of application Ser. No. 08/669,593 filed Jun. 24, 1996, now U.S. Pat. No. 5,726,561.

TECHNICAL FIELD

This invention generally relates to methods and apparatus for providing standard nominal levels of electrical power for operation of equipment, where power sources supplying electrical power to the apparatus may vary in both voltage and frequency. More particularly, the invention relates to a voltage selection apparatus and methods of voltage selection which are dynamically adaptive to fluctuations of a power source so as to maintain the output within a predetermined nominal range. The invention allows electrical equipment to be connected to different sources of voltage with varying characteristics, without worrying about equipment damage. The apparatus may be used as a stand alone unit, or for applications where power variations must not only be compensated for but where power must also be constantly maintained. The apparatus may therefore be selectively used to supply power in conjunction with an uninterruptable power supply (UPS) to supply power to other equipment.

The invention therefore provides voltage selection in a manner which adapts to a local environment and allows improved control and operating characteristics.

BACKGROUND OF THE INVENTION

There are known a variety of devices which monitor input voltage and select an appropriate transformer primary winding tap to attempt to maintain a constant output voltage. These devices are designed to provide a standard nominal level of electrical power so that electrical equipment may be used anywhere, regardless of fluctuations in the power supplied from a local power grid or the like. As should be recognized, the power grids of many areas may not supply constant regulated power, severely impacting proper operation of electrical equipment. Known devices automatically sense the magnitude of the input voltage supplied from the power grid, and attempt to supply a nominal output voltage, commonly being 100, 120, 220 or 240 VAC. A transformer is used in conjunction with an appropriate transformer tap to provide the nominal output voltage. To maintain the output voltage over a wide range of inputs, the transformer has a plurality of taps, and mechanical relays are commonly used to couple the input voltage to the transformer taps to allow the output voltage from the transformer to be decreased (stepped down) or increased (stepped up) to maintain the desired nominal output.

Although providing a nominal output voltage from a fluctuating input, such devices have been found to be deficient in several respects. The devices normally use discrete components, including the use of relay contacts to reconfigure transformer primary windings. Upon detecting a change in input voltage, such devices automatically change taps, requiring a reconfiguration of the state of the relays to produce the desired nominal output voltage. To maintain the desired output voltage, reconfiguring relay taps was normally performed after current to the transformer as well as the mechanical relay coils was reduced to zero, to avoid breaking the relay contacts under current. If current were still applied to the transformer and mechanical relay coils, breaking the contacts under current will generally result in arcing of current from the transformer to the contacts, resulting in deterioration of the contacts. Changing taps under zero current avoids such deterioration, but requires a finite amount of time to reduce the current to zero and effect a tap change. Further time is necessary to let the tap settle down before current is reapplied to the transformer. As an example, the time to turn off current, change the tap selection and reapply current to the transformer may require 8 to 10 seconds where power is not being supplied through the device and to downstream electrical equipment.

In many situations, such devices are used with UPS devices, which allow power to be continuously supplied, even during transformer tap reconfiguration, by means of the battery power supply provided in the UPS. Although continuous power is supplied, relying upon the battery power supply of the UPS to supply continuous power results in significantly reduced battery life in the UPS. Alternatively, if such a device is not used with a UPS, tap selection reconfiguration results in a momentary power outage to the supplied electrical equipment. In known devices, even if used with a UPS, an auxiliary output is normally provided to couple power to non-critical electrical equipment such as laser printers. For a laser printer or other equipment, the momentary power outage produced upon reconfiguring tap selection of the transformer causes the laser printer to reset repeatedly as power is cut off and reapplied. Such devices were thus usable only as an autoconfigurable transformer to provide a desired nominal output voltage, but were not usable as a power conditioner for electrical equipment due to such problems.

Another deficiency in known devices is found in that their response to varying input voltage conditions is based upon the discrete components used therein. The various voltage trip points or thresholds at which transformer tap selections are reconfigured are subject to the selection and tolerances of the components themselves, and simply provide preset voltage trip points for reconfiguring the transformer taps. The devices thus provided a go/no go decision for tap selection based upon a varying input voltage. The go/no go decision has some delay time, based upon the discrete components used, which causes problems similar to that described above. This does not account for certain line conditions which can cause intermittent dips or surges in the input voltage, such as for example when a laser printer is initially turned on and heats up. In this example, the laser printer places high initial current demands on the power supply, but such demand only last momentarily. The fluctuations in the input voltage caused by such occurrences would cause known devices to respond by changing the transformer taps to compensate for the voltage drop. This can result in the device attempting to reconfigure the transformer tap selection to account for the momentary fluctuation in input voltage, and shortly thereafter to flip/flop back to the original tap selection as the device tries to catch up with voltage changes. The use of discrete components also makes it difficult to adapt decisions in reconfiguring tap selections to a particular environment or application. For example, if the device is turned on with the transformer set with a low voltage tap, such as a 100 volts, but the input voltage was 140 volts, the device must change to a higher tap selection, such as the 220 volt tap as an example. Similarly, if a high voltage tap such as 220 volts is selected at start up, line failure or loss of a current phase would cause a voltage drop requiring change to a lower tap selection, even though such conditions were momentary. The discrete tap selections provided by the devices thus may not account for all conditions experienced in an application or environment in which such an apparatus would be desirable.

Known devices are also deficient because they don't account for initial transformer inrush currents when electrical loads are initially energized. Transformer inrush current is the result of core saturation and it can reach a magnitude of ten times the nominal current rating of any electrical equipment acting as a load. Maximum inrush current flows during the first half cycle of the input voltage and then decays within several cycles of the final steady state value. The severity of the inrush is dependent on the relative timing of the removal of line voltage and its reapplication to the transformer. Worst case timing for inrush current is realized when line power is removed just after the transformer magnetizing current cycle has peaked and before it has begun to flow in the opposite direction—leaving the transformer core magnetized. If power is reapplied such that the first half cycle of magnetizing current flows through the transformer in the same direction as when it was last removed, the already magnetized core will be driven into saturation. At saturation, transformer inductance falls to a fraction of its nominal value leaving the relatively low resistance of the transformer winding and the mains or input power line resistance as the only limit to inrush current.

In known devices utilizing a transformer and having a manually operated contactor, the timing of power removal and reapplication will be at random times so that best or worst case scenarios for inrush current are not always realized. However, inrush currents high enough to false trip protectors regularly occur in installations, especially where the transformer has a VA rating near the capacity of the circuit.

SUMMARY OF THE INVENTION

Therefore, in light of the foregoing deficiencies in the prior art, the present invention provides an "intelligent" voltage selection apparatus and methods which overcome such deficiencies. The apparatus and method of the invention provide conversion of a wide range of utility voltages found worldwide, to a fixed nominal voltage level. The invention therefore provides the ability to "plug in" to virtually any power source, and produce a desired nominal voltage for operation of electrical equipment either alone or in conjunction with a UPS device. The voltage selection apparatus provides standard nominal levels of electrical power to equipment while utilizing power sources of varying voltage and frequency. The device is dynamically adaptive to the input power source, and maintains its output within a nominal range even where the input source varies to a substantial degree.

The voltage selection apparatus comprises an input for receiving input AC voltage from a power source, and a transformer to produce an output voltage which is coupled to the input. The transformer has at least one winding and a predetermined plurality of winding taps used to achieve a desired nominal output voltage from the transformer. In the preferred embodiment, the winding taps are provided on the input side of the transformer, with the transformer output provided by a fixed winding. A voltage detector is coupled between the input and the transformer to selectively measure the input voltage and enable output of a selected nominal output voltage. A control circuit is coupled to the voltage detector and monitors the input voltage to produce control signals in response thereto. A plurality of relay devices, each being coupled in series with one of the winding taps are used to select a desired or required tap configuration. The relay devices are controlled by the control circuit to select a predetermined winding tap based upon the input voltage to produce an output from the transformer within a desired nominal voltage range. In the preferred embodiment, a protection circuit is coupled directly to the input to protect the apparatus from over voltages or transient voltage spikes. The voltage detection circuit in the preferred embodiment detects the magnitude of the input voltage and converts this value into a digital representation of a "near" RMS signal. The control circuit may comprise a microprocessor which reads the near RMS voltage and uses the information to control transformer primary winding tap selection relays and/or solid state relay switch devices. If the input voltage is within a predetermined voltage range, the protection circuit will couple the input voltage to a solid state relay device (SSRD), which effect a tap change or in turn supply voltage to tap selector relays. Through the relay device, the supply power is coupled to the transformer. In preferred embodiments of the invention, the use of mechanical relays or solid state relay devices allows flexibility in performance and operation. The apparatus may include other safety features to ensure proper operation and to avoid potential damage to electrical equipment connected thereto.

The invention also provides methods of operation for regulating output voltage from a transformer having a plurality of voltage taps and being supplied with an AC input voltage. In one aspect, the method of the invention will firstly detect the magnitude of the AC input voltage and select a tap of the transformer to supply a predetermined nominal output voltage based upon the input voltage. Thereafter, it is determined if a change in the input voltage would require a change of the selected transformer tap to maintain the nominal output voltage. If such a tap change is required, it is initiated by detecting a zero crossing of the input voltage and turning off current to a switch coupling the selected tap to the input voltage. A determination of a different transformer tap to be selected to supply the nominal output voltage is made, and current is selectively supplied to the switch coupling the input voltage to the different transformer tap. The step of supplying current to the switch of the different transformer tap is performed at a predetermined time relative to turning off current to the switch of the previously selected tap based upon the different tap to be selected. The methods of the invention include a no-break tap change with forced commutation of current and synchronized tap change with natural current communication. The methods allow transformer tap changes without interruption of power to the load and/or with minimal transient current surges on the power line.

It is also an object of the invention to provide an apparatus and methods which minimize tap selection changes, and allowing use of the apparatus with electrical equipment having switch mode power supplies without any detrimental effects. It is a further object of the invention to provide an apparatus and methods which allow functioning as a voltage regulator which is autoconfigurable based upon the input voltage, to produce a desired nominal voltage regardless of variations in the input voltage. It is further desired to provide an apparatus and methods which can function as a power conditioner for downstream electrical equipment. These as well as a variety of other objects and advantages of the invention will be recognized upon a further reading of the description of the preferred embodiments, with reference to the figures.

It is a further object of the present invention to alleviate initial transformer inrush current problems by a gradual application of input (mains) voltage. The invention controls conduction of input power by beginning with small angular segments of the input voltage cycle. Over a period of several cycles, the angle of conduction is increased until complete cycles of current are flowing through the transformer. This demagnetizes the transformer core and locates the quiescent magnetic flux point within the center of the core material's hysterisis loop. Core saturation and accompanying inrush current is greatly minimized. This "soft start" reduces inrush current surges on the input power supply circuit to levels which will not actuate nominally sized over current protection devices or cause their long term fatigue and failure.

BRIEF DESCRIPTION OF THE DRAWINGS

FIG. 1 is a block diagram of a first preferred embodiment of the invention.

FIG. 2 shows a block diagram of a first preferred embodiment of the invention using a first preferred transformer configuration in conjunction therewith.

FIG. 11 is a schematic graphical representation of voltage and current waveforms for the synchronized tap change method according to the invention.

FIG. 14 is a schematic graphical representation of gradual application of input voltage to the present invention.

DETAILED DESCRIPTION OF THE INVENTION

Figure 3A:
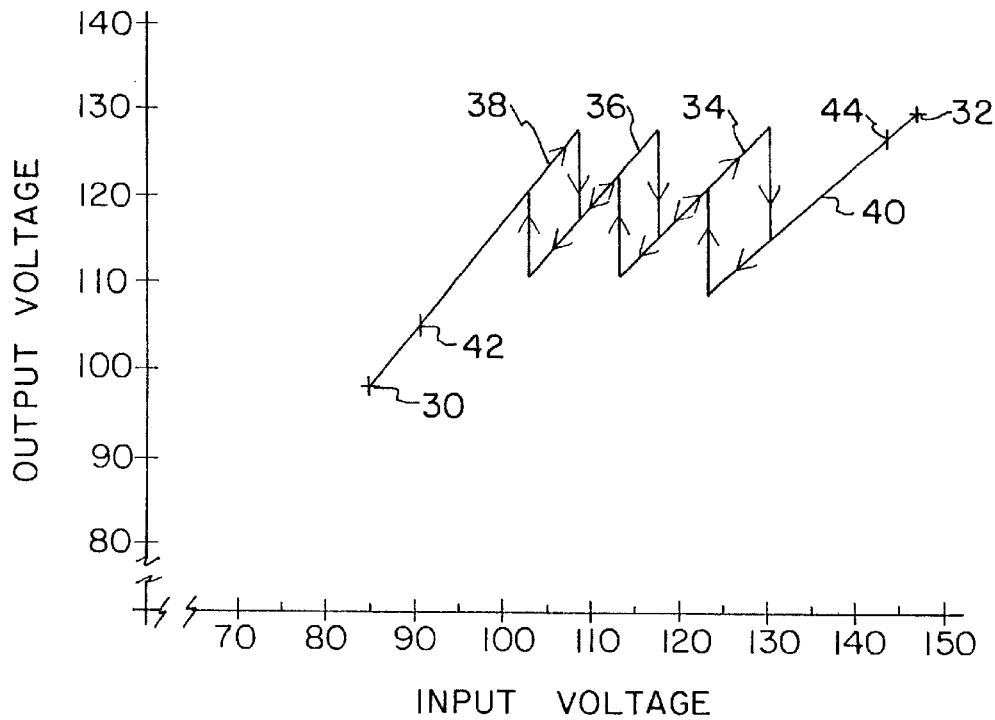
FIGS. 3a–3b show graphs of input voltage verses output voltage for a transformer configuration as shown in FIG. 2, indicating system hysterisis response to the line voltage at particular nominal input voltages.

Turning now to FIG. 1, a first embodiment of the voltage selection apparatus or intelligent voltage selector (IVS) is generally designated as 1. The IVS 1 is selectively coupled to an AC input source 2, with the AC input source 2 supplying AC voltage which can vary within a predetermined nominal range according to the transformer configuration used in conjunction with the apparatus. The AC voltage supplied to IVS 1 can also vary in frequency, and IVS 1 is designed to accommodate an input voltage which can vary substantially with respect to both voltage and frequency. Despite the substantial variations in input voltage which may be encountered, IVS 1 provides a stable nominal output voltage at the output 20. The nominal output voltage at 20 may be selected to accommodate the downstream electrical equipment or loads with which the IVS 1 is used. For example, a nominal output voltage of 120 VAC, 220 VAC, 240 VAC or any other desired voltage magnitude may be selected. In the preferred embodiment, the AC input source 2 is electrically coupled to a protection circuit or over voltage control (OVC) 4. The OVC 4 is preferably configured to protect the circuits of the IVS 1 from excessive or transient voltages, but may also provide protection from high current surges or other line conditions. The OVC 4 may be implemented using a combination of fuses, circuit breakers, varistors or other voltage and current limiting devices. In addition, two individual SPDT relay contacts may be tripped when either the power line frequency or voltage is outside of a predetermined range to signal voltage or frequency out of range conditions to externally attached devices. The OVC 4 preferably turns off the entire circuit of IVS 1 upon the occurrence of an out of range condition. Further, OVC 4 may be implemented as an absolute fail-safe function, using passive components which function regardless of other circuit failures, such as control circuitry or power supply failure. The OVC 4 will also preferably contain other circuit components to supply proper power and control signals to other components. A power supply 10 is preferably coupled to the line voltage and may be used to supply bipolar voltages to other circuit components. A precision voltage source can provide reference voltages to circuit components, such as to an A/D converter used to convert the analog input voltage to a digital, near RMS value signal supplied to the control circuit 8. In the preferred embodiment, a voltage and frequency detector 6 is coupled to the OVC 4, and supplies signals to the control circuit 8. A signal transformer may be used in the detector 6 which is coupled to the input line to reduce power line voltages to usable levels for analog circuit components. The output from such a transformer can be coupled to a precision rectifier circuit and thereafter coupled to an A/D converter. As will be hereinafter described in more detail, the output from the A/D converter may be coupled to the processing unit 8, and compared via system firmware to a set of parametric data, with control system actions based in part on the results thereof. The output from the signal transformer may also be supplied to a comparator circuit which produces a square wave response as the AC voltage crosses zero, acting as a zero crossing detector. The output from the zero crossing detector can be applied to the processing unit, to produce control output signals, or zero crossing interrupts for calculating power line frequency and performing tap change operations. These circuit components and their functions are well known and one skilled in the art can execute a variety of circuit configurations to perform the desired functions, with all such variations contemplated in the invention.

Upon application of an AC input voltage, the power flow through the device 1 is along path 22, coupling the output of OVC 4 to the input of a solid state relay device (SSRD) 14. The output of SSRD 14 preferably provide dynamic switching operations involved in connection to the power line and in changing transformer taps. The SSRD 14 can also be used to supply mechanical relays 16 which may optionally be used for particular transformer configurations. The SSRD 14 and relay 16 if used, configure transformer 18 for producing the desired nominal output voltage at 20.

Other components of IVS 1 monitor and control power flow through the device. Electrically coupled to the output of OVC 4 is the power supply 10 and a voltage/frequency detector (VFD) 6. A processing unit 8 includes logic circuitry which controls operation of the device in response to the AC input voltage at 2, as well as enabling operation with various load characteristics. Power supply 10 may also be equipped with an auxiliary power input 12 which allows an alternate input source to supply power for operation of various circuit components. For example, a battery power supply (i.e. from a UPS) can be connected to auxiliary power input 12, enabling the processing unit 8 to maintain its memory or limited control of IVS 1 if the AC input source 2 is unable to provide the necessary power.

The voltage detector 6 monitors the voltage amplitude of the AC input source 2. In the preferred embodiment, the input voltage must be within a predetermined range to enable output of the desired nominal voltage at 20. The voltage detector 6 also preferably can monitor and determine the frequency of the AC input source 2, again requiring that the frequency be within a predetermined range to enable output from IVS 1 in the preferred embodiment. The voltage detector 6 may measure the voltage amplitude as an RMS value or at least a "near" RMS value. A main function of IVS 1 is to accommodate significant voltage fluctuations in the AC input source 2, and correspondingly produce a substantially constant nominal output voltage. In many places in the world, the local power grids may not provide stable power output, and large fluctuations in supply voltage may occur. Such fluctuations if not accounted for may cause significant damage to downstream electrical equipment, and IVS 1 is designed to protect such equipment and supply stable power requirements for operating such equipment. In addition, the power supplied may also vary from a sinusoidal waveform. Detector 6 can monitor and combine the measured RMS (or near RMS) voltage amplitude with a measured peak voltage amplitude as a ratio, such that the IVS 1 can account for different types of waveforms. In the preferred embodiment, the frequency of the AC input source is also monitored by detector 6 allowing the processing unit 8 to determine if the frequency of the input source is within a predetermined range. If the frequency of the input AC voltage is outside of an acceptable or predetermined range, IVS 1 will not enable transformer 18 so as to not supply power to downstream equipment under such conditions.

The processing unit 8 controls many functions of IVS 1 in operation, and may comprise either separately or as an integrated whole, a microprocessor or micro controller, random access memory (RAM), non-volatile memory (NOVRAM), EEPROM, or flash, program memory (EPROM), analog input circuits, A to D converters, digital output circuits and all associated control and driver circuitry for interfacing with other circuit components.

In operation, the processing unit 8 is used to determine the proper transformer tap selection to provide the desired nominal output voltage based upon the characteristics of the input voltage. In general, the processing unit 8 is used to control the driver circuitry of the SSRD 14, selectively turning off current to the various switches forming the SSRD 14 prior to implementing a tap selection change. The processing unit 8 will thereafter automatically reconfigure transformer 18's primary winding by selection of an appropriate tap to provide the desired nominal output voltage. Various operating methods will be described hereinafter, allowing unique and advantageous functions to be achieved for various applications or environments in which the IVS 1 is used.

Turning to FIG. 2, a first embodiment of the IVS 1 includes a multitap transformer 25, having a number of predetermined tap configurations on the transformer's primary winding to provide the desired nominal output voltage. The multitap transformer 25 in a preferred example may be used with nominal input voltages of 120 volts and 240 volts.

The multitap transformer 25 for use with a nominal 120 volt input includes multiple tap selections to provide compensation for an input line voltage between 88 to 138 volts. Again in the preferred embodiment, the taps of transformer 25 provide respective boosts of 11 and 24% applied to the input line voltage when the input line voltage falls below either 105 or 99 volts. Similarly, a decrease of 9% is taken from an input line voltage which exceeds 128 volts for compensation within a predetermined voltage range. The output voltage from transformer 25 is nominally in the range of 115 to 125 volts, and predetermined minimum and cut out limits are set for the nominal 120 volt input range. In the preferred embodiment, a minimum cut out limit of 80 volts and a maximum cut out limit of 145 volts may be provided. It should be understood that other tap configurations around a given nominal input voltage may be set, with the desired tap configuration for a particular application contemplated within the invention.

The multitap transformer 25 is preferably an isolation transformer which is designed to make voltage selections around the given nominal input voltage and to provide step increases to accommodate the input line voltage fluctuations which may occur. In this manner, the IVS 1 may function as a power conditioner as will be hereinafter described in more detail. The step increases or decreases of the multiple tap selections provide a broad range around a nominal input voltage. It is also desirable to minimize transformer tap changes, and the transformer 25 will preferably have a hysterisis response which will allow a particular tap configuration to accommodate input line voltage which varies to some degree. FIG. 3a shows the hysterisis response for a preferred embodiment of the transformer 25 for the nominal 120 volt input, showing the low voltage dropout point at 30 and the high voltage dropout at 32. About each of the transformer taps, the hysterisis response of the transformer provides a range of input voltages about each of the transformer taps to provide buffering about each of the taps to reduce tap changes when smaller or short duration input line voltage variations occur. Again in the preferred embodiment, the tap selections for a nominal input line voltage of 120 volts may be configured as step increases and decreases about the 120 volt tap at 34, such as a step increase of 11% to provide a 108 volt tap at 36, or a 24% step increase to provide a 97 volt tap 38. Similarly, a step decrease of 9% provides a 132 volt tap 40. In this transformer configuration, a low voltage drop in value 42 and a high voltage drop in value 44 define the response characteristic of the transformer.

Figure 3B:
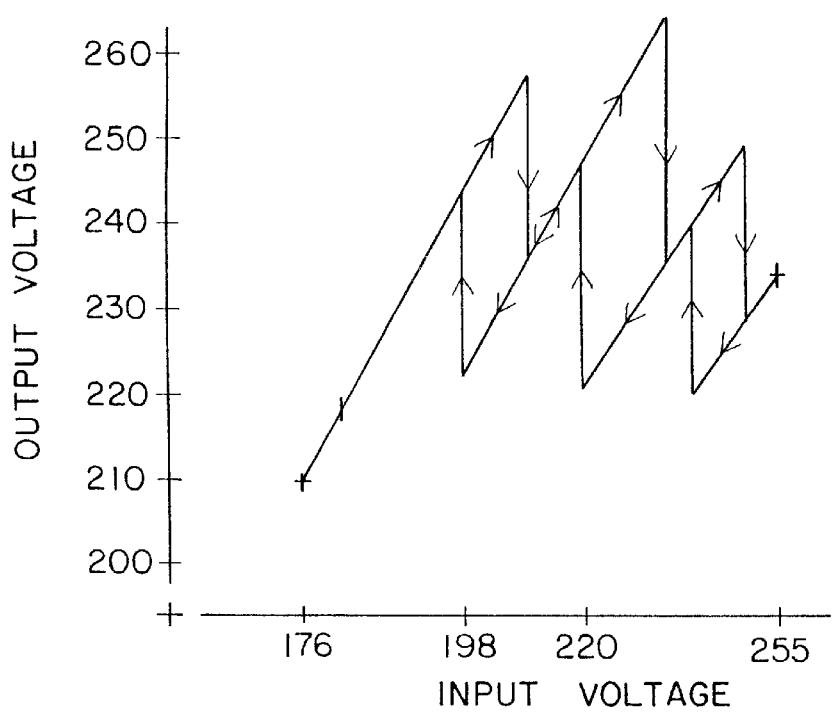

Similarly, a nominal 240 volt input transformer configuration may also be provided by transformer 25 of FIG. 2. This option provides compensation for an input line voltage within a predetermined range, which in a preferred example may be between 176 to 255 volts. Similar step increases of 11 and 24% may be applied to the input line voltage when it falls below either 198 or 228 volts, while a step decrease of 9% may be taken from an input line voltage which exceeds 250 volts. In a transformer configuration of this type, two nominal outputs of between 228 to 250 volts and 208 and 230 volts may be provided. Similarly to the nominal 120 volt input option, the minimum and maximum cutout limits define the voltage window which can be accommodated in this option, which in the preferred example is 168 and 255 volts. FIG. 3b shows the hysterisis response to the line voltage for a preferred transformer 25 in accordance with the above specifications, providing taps of 198 volts, 216 volts, the nominal 240 volt tap and a 264 volt tap.

Figure 4:
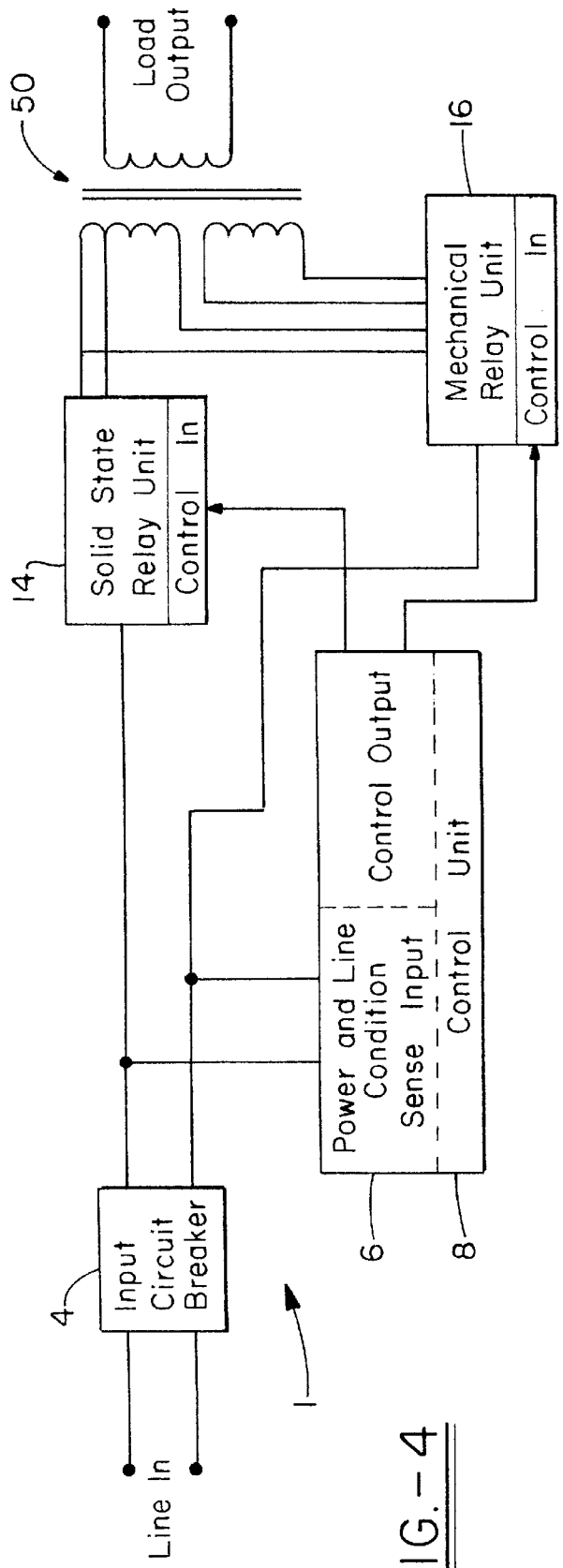
FIG. 4 is a block diagram of another preferred embodiment, showing an alternative transformer configuration for use in conjunction therewith.

As another system option for a multitap transformer configuration, FIG. 4 shows a dual range transformer, to provide nominal 120 or 220 volt output. The dual range transformer 50 incudes primary taps for either the 120 or 220 volt operation, and a mechanical relay unit 16 is preferably used to set its primary taps for either nominal input voltage. In this option, the mechanical relay unit 16 is controlled by control unit 8 along with the SSRD 14 to automatically configure the transformer 50 for the actual input line voltage from the power source. With this transformer option, the IVS 1 performs as an autoconfigurable voltage selection device which provides a desired nominal output voltage for a given input line voltage. In operation, the control unit 8 is utilized to measure the power line voltage using the voltage detector 6 to sense input line conditions. Upon power being applied to IVS 1, the IVS will measure the power line voltage and depending upon the available voltage, choose the appropriate configuration for transformer 50 to provide the desired nominal output voltage. Both low and high voltage windows are provided to accommodate a wide range of voltages, and once line voltage is determined and transformer 50 configured, it is assumed that the high or low voltage window will accommodate any variations in line voltage. Thus, in the preferred embodiment, configuration of transformer 50 by mechanical relays 16 occurs only when the IVS 1 is powered on, and no switching between the high and low voltage windows thereafter occurs. The SSRD 14 is used to make tap changes within each window. By setting the transformer in either the 120 volt or 220 volt configurations, and not allowing switching therebetween, the IVS allows operation of auxiliary equipment from an auxiliary output of a UPS for example without switching between voltage windows which may adversely effect the auxiliary equipment. Each of the voltage windows has an upper and lower voltage limit, which will function to disable output to the load to protect downstream equipment if the input line voltage goes out of a given range. The line condition detector 6 provides an ongoing instantaneous voltage measurement of the input line voltage to perform this function.

Figure 5A:
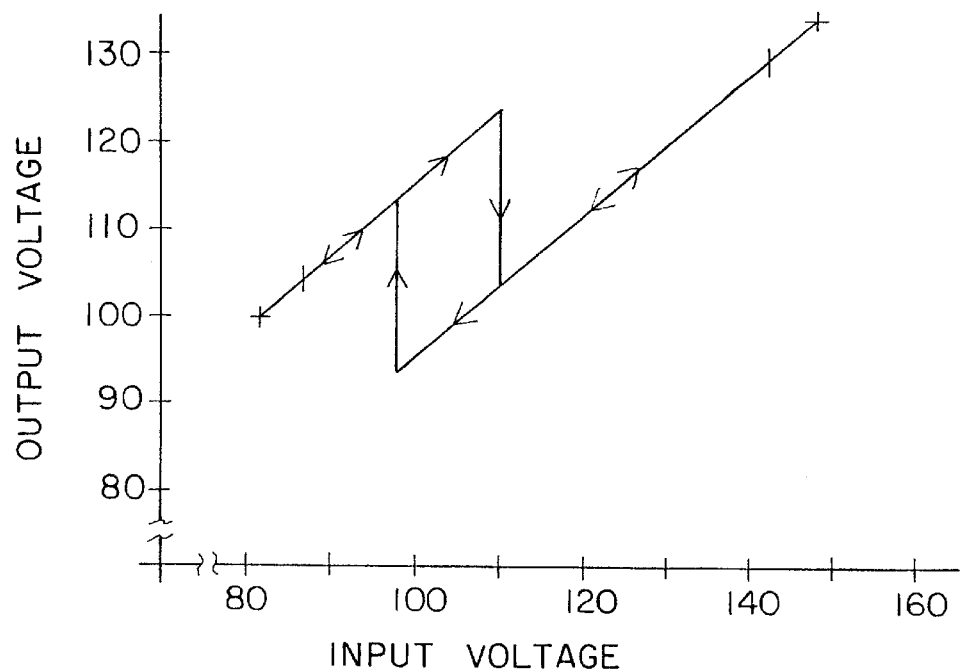
FIGS. 5a–5b show graphs of input voltage versus output voltage, illustrating the system hysterisis response to line voltage at various nominal input voltages.
Figure 5B:
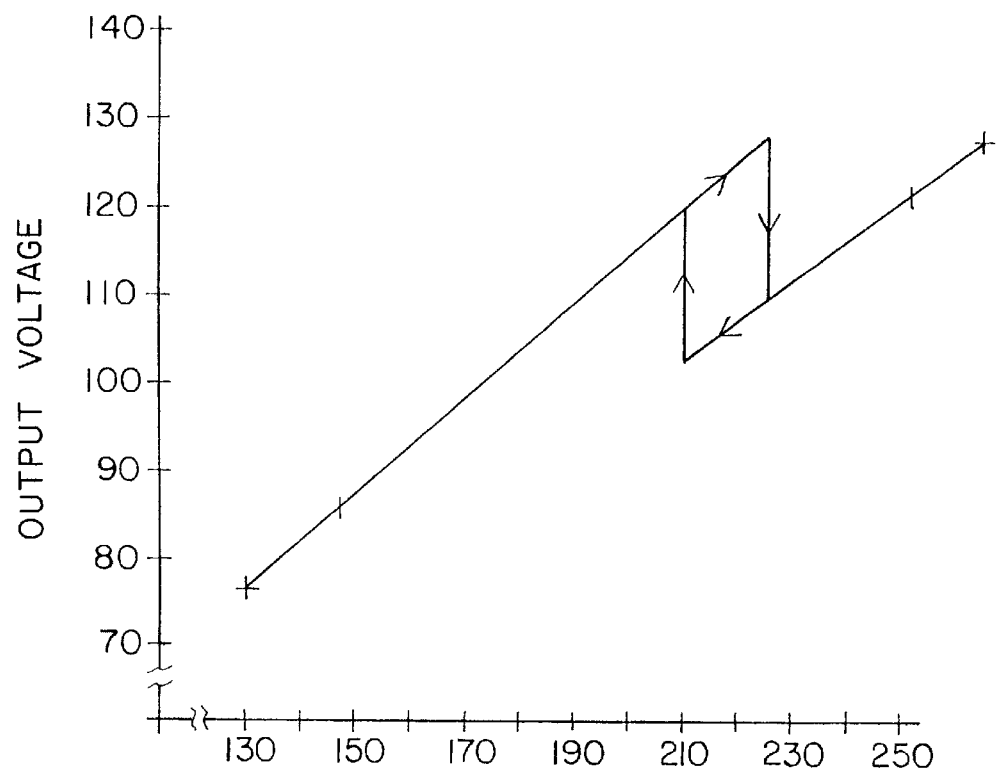

In each of the 120 or 220 volt configurations for transformer 50, several tap configurations are provided to accommodate input voltage variations. When the 120 volt configuration is chosen, the IVS 1 accepts an input line voltage within the range of 85 to 140 volts in the preferred embodiment, and provides tap selections which will boost the voltage by 20% for an input that falls below 96 volts. The 120 volt configuration provides a nominal output of 102 to 130 volts in a preferred example. FIG. 5*a* shows the hysterisis response for the 120 volt configuration of transformer 50, which helps limit tap changes to points where they are necessary. Similarly, the 220 volt configuration of transformer 50 provides a configuration which accepts an input line voltage about the nominal 220 volt value. In a preferred example, an input voltage in the range of 146 to 248 volts may be accommodated, with the tap selections allowing the voltage to be boosted by 10% for line input voltages falling below 208 volts. In this example, a nominal output of between 83 to 125 volts is provided. FIG. 5*b* illustrates the system hysterisis response to the line voltage for the 220 volt configuration.

With the three transformer configuration options described, the control unit 8 may be easily configured for each of the options using the microprocessor based control system. For example, the controller 8 can be set to default to the dual range transformer option when jumpers are absent. In the preferred example, the operating line frequency for each of the transformer options will lie in the range between 40 to 70 Hz., and the transformer is shielded and provides isolated outputs to protect downstream equipment. It should be recognized that other transformer configurations to provide necessary tap configurations for desired applications are contemplated within the invention.

Turning now to operation of the apparatus to perform the methods of the invention, wherein the controller unit 8 is used to store and execute the major functions which accomplish voltage measurement, frequency measurement if desired, timing and output control. In addition, the control unit 8 preferably provides status indications to the user at the location of apparatus 1 or at a remote site via a serial peripheral interface and serial communication interface. In the preferred example, the control unit 8 also is used to track total hours of operation to monitor performance of the IVS 1.

Power Up Procedure

Figure 6A:
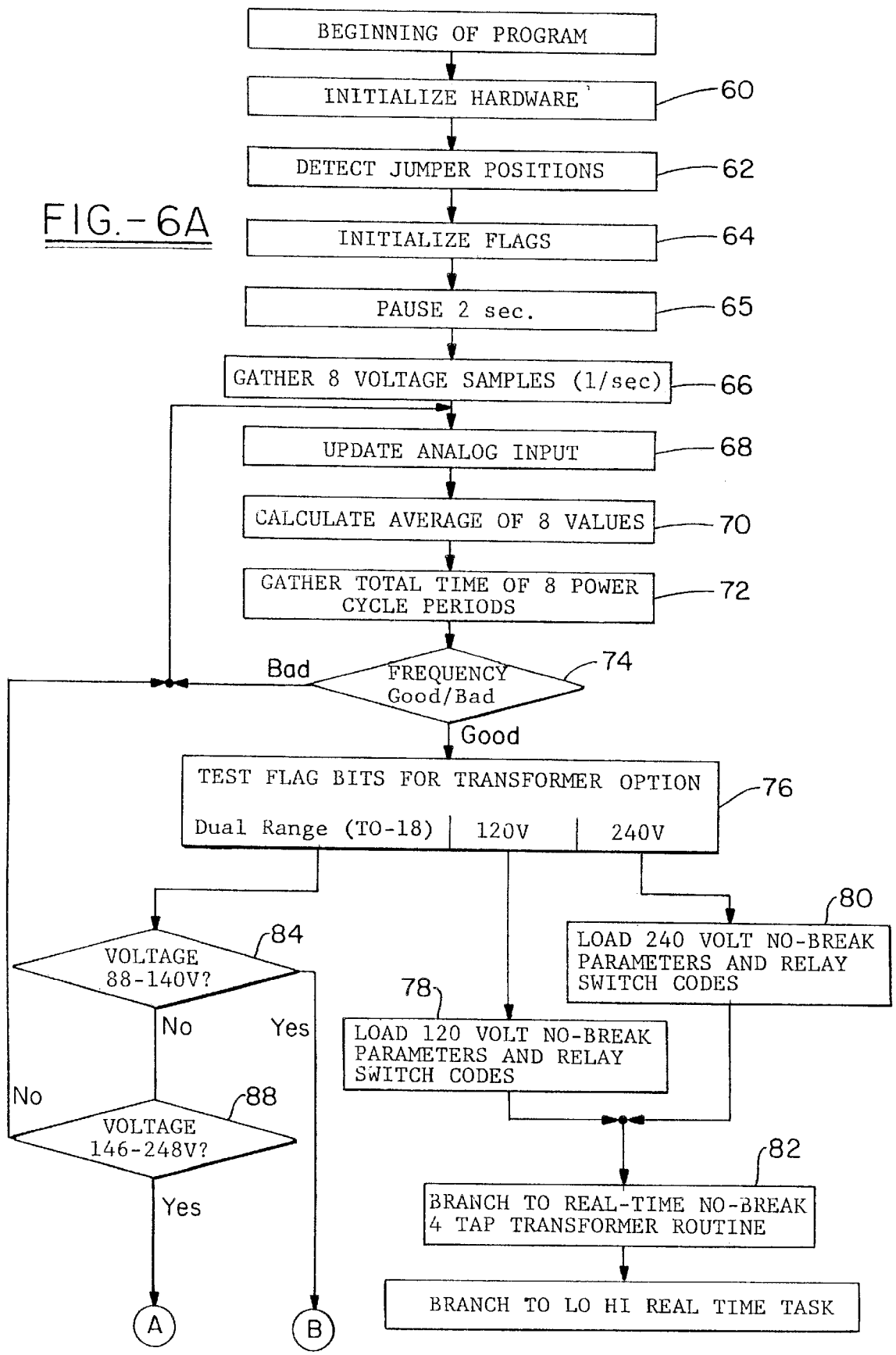
FIG. 6 is a flow diagram of an initialization process performed at start up in operation of the apparatus.
Figure 6B:
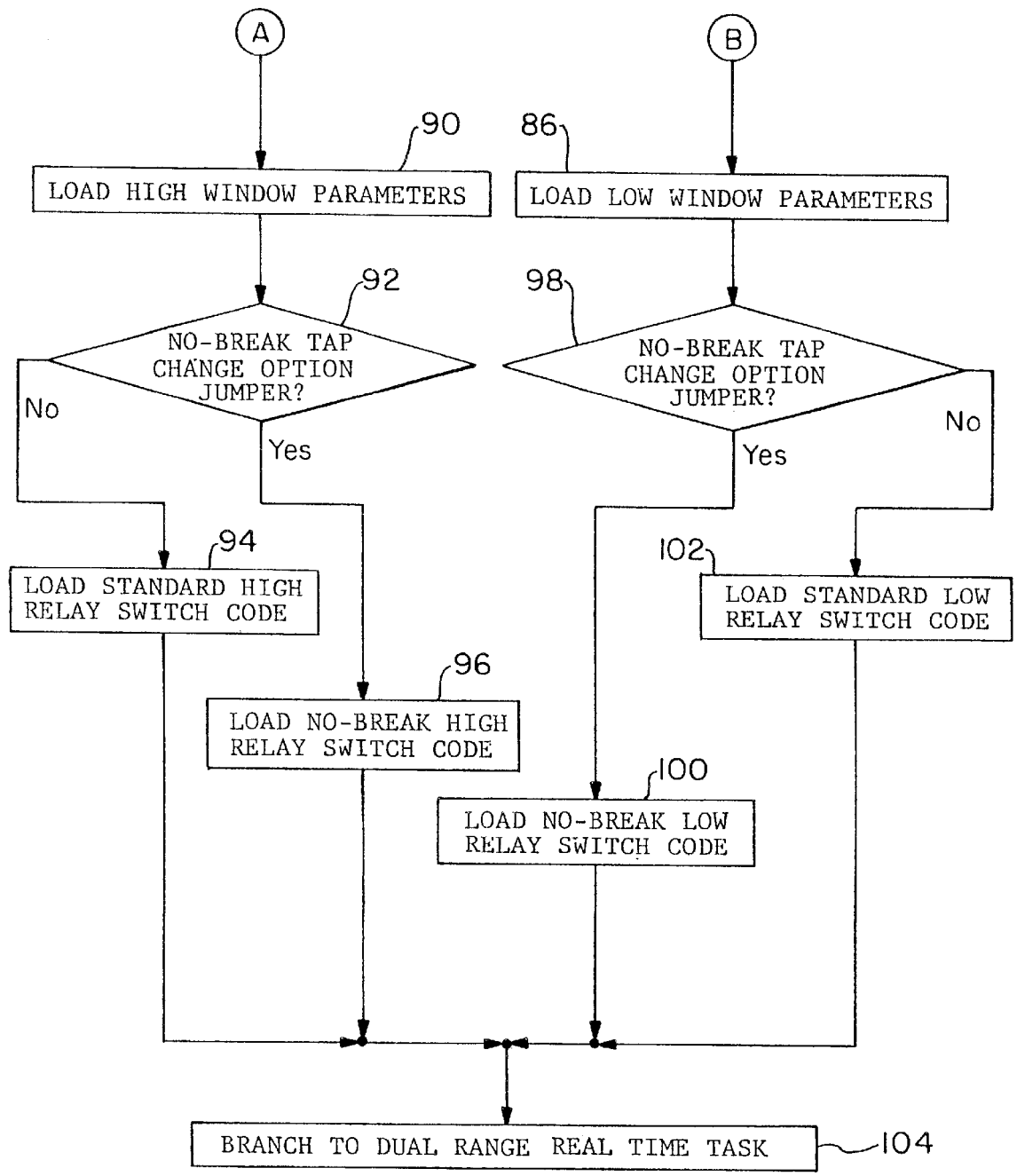

In the preferred example, when the IVS 1 is powered on, the control unit 8 initializes the system hardware and collects initially required information about the power lines voltage and frequency characteristics. FIG. 6 shows a preferred example of system firmware to conduct the initialization sequence, wherein power applied to the IVS 1 will implement an initialization routine, where hardware is initialized at 60 and thereafter the control unit 8 detects the type of transformer installed in IVS 1 at 62. For the type of transformer configuration, flags are initialized at 64, and after a short pause 65 the control unit 8 is used to monitor input power line characteristics. Thus, after allowing two seconds (or other time) for the analog circuits to settle down, the preferred example may take eight samples of the power line voltage at predetermined intervals at 66. These values are entered and updated in a table stored in memory at 68 and used to calculate an arithmetic average at 70. In conjunction with voltage sampling, the period of eight successive zero crossings of the power line is concurrently measured at 72, giving an indication of the frequency characteristics of the line. For initialization to pass on to loading parametric data, the power line frequency must be within a predetermined range, such as between 40 to 70 Hz. Further, dependent upon the transformer configuration used, the input line voltage may be required to be within a predetermined range to be accommodated by the transformer. Thus, the control unit 8 monitors the input line and the initialization routine determines whether IVS 1 can be properly operated based on the characteristics of the power line. If the frequency of the input power is outside the predetermined range at 74, the initialization will loop and continue monitoring line voltage and updating its measurements until the power line characteristics become valid.

Upon reviewing valid power line characteristics at 74, the loading of parametric data based upon the power line input is conducted at 76. The flags initialized at 64 are tested to determine the transformer option at 76, being the dual range option or the HI/LO voltage window options. Operation of the IVS 1 will be dependent upon the type of transformer configuration chosen. For each of the 120 or 220 volt options in the HI/LO window configuration, the no-break parameters and relay switch codes are loaded at 78 or 80 respectively. Once these parameters are loaded, the no-break tap transformer routine is selected at 82 for one of these options. Alternatively, if a dual range transformer is used, input line voltage must also be within a predetermined range as previously described, such as between 88 to 140 volts for the low voltage range at 84. If the input line voltage is within this range, the low voltage range is chosen and the low window parameters are loaded at 86. If the input line voltage is within the high voltage window in the dual range configuration at 88, such as between 146 to 248 volts, the high voltage window is selected and the high window parameters are loaded at 90. Thus, parameters for the selected voltage window which fits the input line voltage are selected and loaded, and preferably not adjusted thereafter. Once the proper voltage window is selected, operation of the IVS is chosen at 92, to utilize a no-break tap change option, which may be selected by a jumper configuration in the control unit 8, or a standard high relay switch option is chosen at 94. If the no-break tap change option is chosen at 92, the no-break, high relay switch code is loaded at 96. Similarly to the high voltage window selection, if the initial input line voltage was within the low voltage window range, the low window parameters would be loaded at 86 and thereafter the similar determination of selection of the no-break tap change option at 98 is made. If so, the no-break low relay switch code is loaded at 100, or the standard low relay switch code is loaded at 102. With each of the selections of transformer configuration and subsequent initialization of the system, execution of a selected real-time task begins at 104. Parametric data for each of the operational modes is loaded into a table in the system RAM from one of four sets of data contained in the system ROM. Each set of parametric data contains four absolute under and over voltage limits, an operating window range, threshold points for transformer tap changes and relay and switch codes associated with transformer taps.

In each of the transformer configurations, the taps of the transformer are connected through SSRD 14, having a plurality of solid state switches as previously described. Such switches are preferably of the random turn on type, allowing the switch to be turned on substantially instantaneously when a control signal is applied. On the other hand, when the control signal is removed, turning the switch off is not instantaneous, and the switch remains on until the current through the switch is reduced to zero. When the transformer configuration must be changed to accommodate variations in input line voltage, an instantaneous tap switch may cause an undesirable short circuit in the transformer, as two solid state switches would be conducting simultaneously. In the present invention, a unique approach to changing transformer taps without use of current sensing systems or current limiting devices is provided. The solid state switches used in tap selection are not exposed to short circuit conditions, and such switches do not have to be overrated to accommodate such conditions. In a first preferred method of operation, switching between transformer taps is performed without interruption of power to the load, which may be termed a power conditioning operational mode.

Soft Start Mode

In the soft start mode, the IVS 1 alleviates inrush current problems associated with initial application of AC power to electrical devices, by a gradual application of AC input voltage. The IVS 1, shown in FIG. 1, provides transformer 18 with input power by controlling SSRD 14 to in turn control the angle of conduction of the input power. In the preferred embodiment, the IVS 1 executes the soft start in a four cycle period of input power. The use of four cycles is a practical matter and the number of cycles and time values can be changed to suit other applications as necessary. Turning to FIG. 14, operation of the soft start mode is shown in relation to the schematic graphical representation of the gradual application of input voltage to a load. Once IVS 1 has completed the power up procedure, execution of the input voltage soft start is controlled by processing unit 8. Processing unit 8 begins by initializing a software timer for a total duration of time equivalent to approximately 155° of the AC input voltage cycle period at 300. The software timer may have eight steps of time each equivalent to approximately 17° of the AC input voltage cycle period 300. Processing unit 8 utilizes frequency measurement data acquired during the power up procedure of IVS 1 to adapt the time which the software timer operates by to the frequency of the input voltage. At the detection of the positive zero crossing of the AC input voltage, the software timer is started at 306. Once the software timer has started, control of the input voltage by SSRD 14 is asserted when the timer reaches the eighth step at 308 or at approximately 138° of the AC input voltage cycle period. At position 310, which is equivalent to approximately 155° of the AC input voltage cycle period, control of SSRD 14 is removed. Because the preferred embodiment of IVS 1 uses switching devices with random turn on and zero current dropout characteristics, described in more detail later, current continues to conduct through SSRD 14 until the transformer magnetizing current falls to zero slightly into the negative half of the AC input voltage cycle period at 312. Processing unit 8 of IVS 1 repeats the above process with a negative half of the AC input voltage cycle period upon detection of the zero crossing point. This time control of SSRD 14 is asserted earlier, when the seventh step of the software time is reached at approximately 121° of the AC input voltage cycle period at 316 and remains until its removal at approximately 155° of the AC input cycle period at 318. This process continues for each half of the following three AC input voltage cycles, with earlier steps of the software timer selected to progressively assert control of the SSRD 14 approximately 17° sooner in the cycle thus increasing the angle of conduction of input power to transformer 18. Thereafter conduction of AC input power is made continuous, allowing passage of full cycles of current. When referring to the angle of conduction it should be understood that Applicant is referring to the length of the cycle period in which power is applied to a load. With reference to FIG. 14, as control of SSRD 14 is asserted earlier in the half cycle period, the starting point in degrees decreases but the period of time that power is applied to a load increases. When the angle of conduction increases it should be understood that the length of time that power is applied to a load increases as well.

Figure 15A:
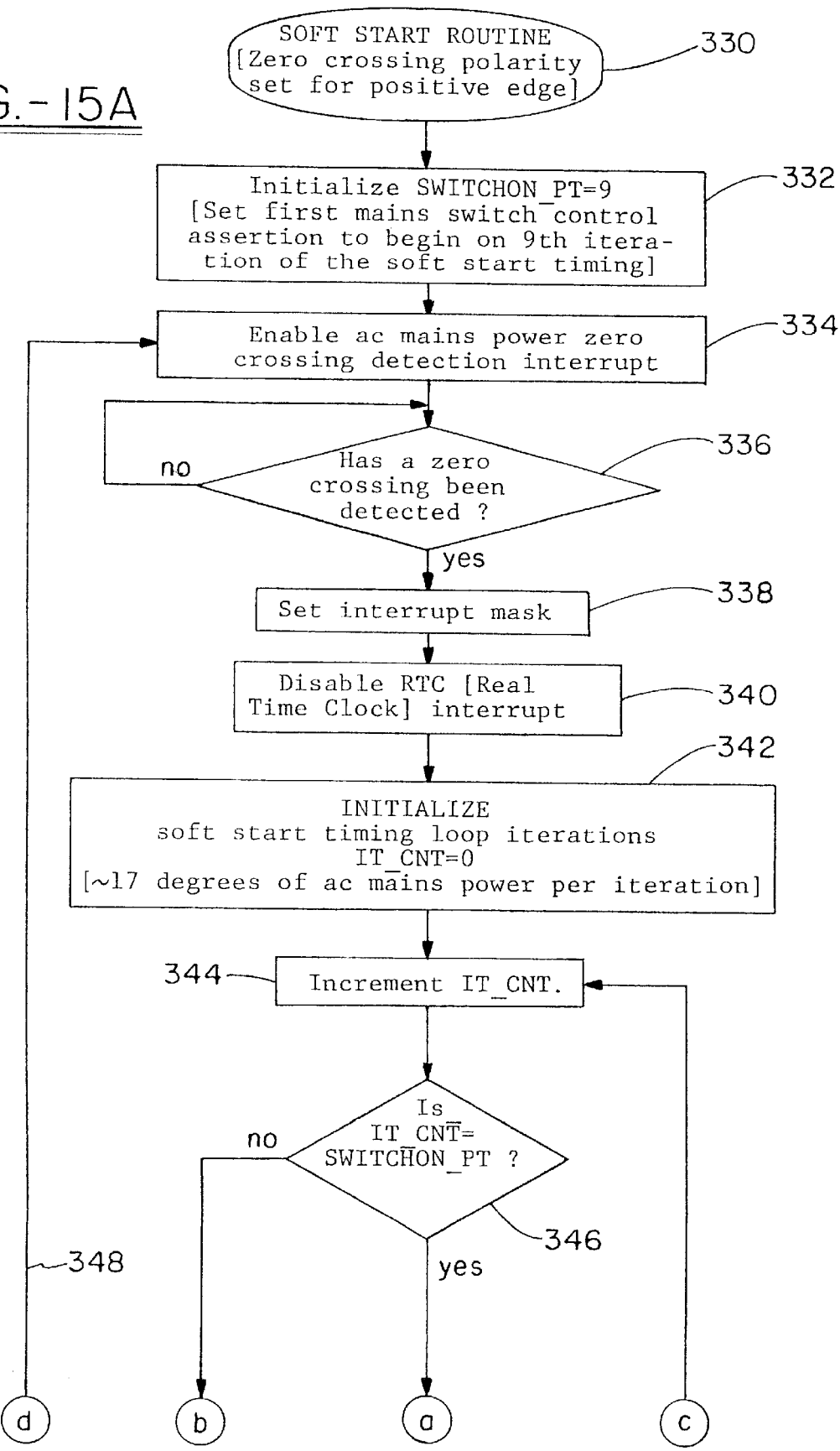
FIGS. 15a and 15b are flow diagrams showing operation of the soft start operation of the apparatus by the control system for soft start operation.
Figure 15B:
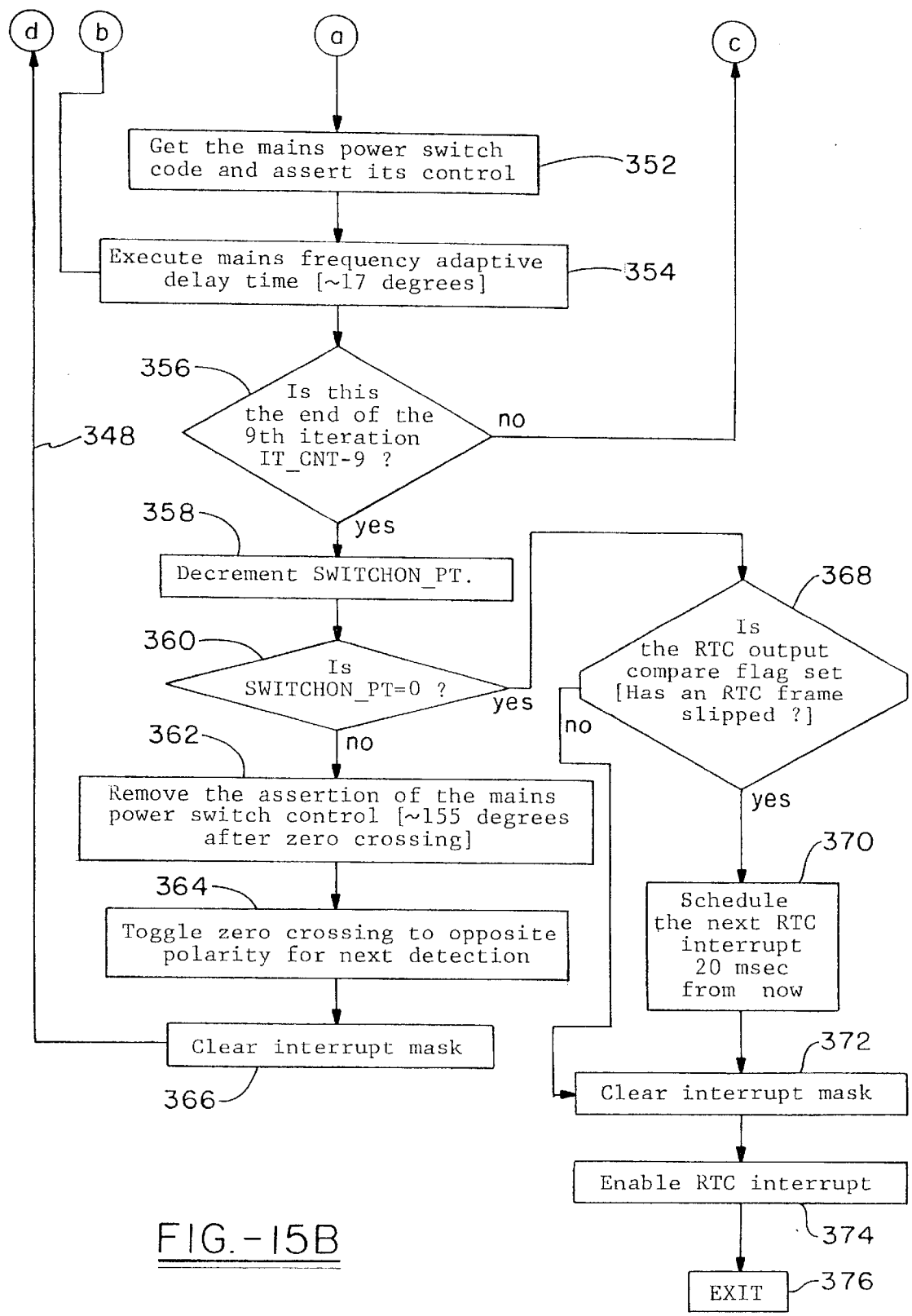

With reference to FIGS. 15a and 15b, the sequence of performing a soft start will be described in more detail. On completion of the power up procedure for IVS 1, control unit 8 initiates the soft start subroutine at 330. At this point, processing unit 8 monitors the AC input voltage in search of a positive edge for the next zero crossing point. The soft start mode is controlled by a software timer comprised of a loop that processing unit 8 executes a number of times. A nested sub-loop uses the AC input voltage or mains power period measurement for adapting a counter to the frequency of the AC input voltage. Applicant has used the term "mains" and "ac mains" in FIGS. 15A and 15B. To ensure the term is clearly understood, mains or ac mains is equivalent to AC input power. In the preferred embodiment, the sub-loop has an execution time of six microseconds and uses the most significant byte of the AC input voltage cycle period as its iteration count. Nine software timer loop iterations, approximately 17° per iteration, constitute a timing sequence that expires after 155° of the AC input voltage cycle period. Loop iteration counter 358 provides eight set points through the duration of the software timer for actuating SSRD 14. Counter variable SWITCHON_PT is initially set equal to nine at 332 so the first control assertion of SSRD 14 begins on the ninth iteration of the software timer loop. Once counter variable SWITCHON_PT is initialized, processing unit 8 enables and begins monitoring the AC input voltage for a zero crossing at 334 and 336. Soft start routine 330 continually loops at 336 until a zero crossing of the AC input voltage is detected at which point an interrupt mask is set at 338 which processing unit 8 will use to determine the status of external conditions. The IVS 1 real time clock interrupt will next be disabled at 340 to prevent any interruption of the soft start software timer loop iterations once initiated. Next, processing unit 8 initializes another counter variable IT_CNT to zero at 342. Each value of counter variable IT_CNT represents a soft start timing loop iteration or approximately 17 degrees of the AC input voltage cycle period per iteration. Counter variable IT_CNT is incremented at 344 and then compared to counter variable SWITCHON_PT at 346. Initially, the two counter variables SWITCHON_PT and IT_CNT will not be equal thereby causing processing unit 8 to execute a delay at 354 equal in time to approximately 17° of the AC input voltage. At the end of each 17° delay processing unit 8 checks counter variable IT_CNT at 356 to determine if the number of loop iterations has reached the time necessary to reach the 155° point of the AC input voltage cycle period. If counter variable IT_CNT has not reached the time necessary to reach the 155° point, counter variable IT_CNT is incremented at 344 and the process is repeated until counter variable IT_CNT is equal to counter-variable SWITCHON_PT. Once the two variables compare as equal to one another at 346, processing unit 8 asserts control over the AC input voltage at 352 by turning SSRD 14 on thereby providing AC input voltage to transformer 18. Once this occurs, counter variable IT_CNT will indicate that the ninth iteration has been reached when tested at 356, counter variable SWITCHON_PT will be decremented at 358 and then counter variable SWITCHON_PT will be tested at 360 to see if it has reached a zero count.

If counter variable SWITCHON_PT is not equal to zero at 360 the AC input voltage for mains power is removed from the load at a point in the AC input voltage cycle approximately 155° after the previous zero crossing point of the AC input voltage. Thereafter, IVS 1 is configured at 364 to detect a zero crossing point having an opposite polarity of the previously detected zero crossing point and the interrupt mask previously set at 338 is cleared at 366. Control of IVS 1 then returns to steps 334 and 336 to detect the next zero crossing point of the AC input voltage or mains power in order to repeat the next gradual application of AC input voltage to the load. Once the number of predetermined cycles of gradual application of AC input voltage are complete, which in the preferred embodiment disclosed is four cycles, counter variable SWITCHON_PT will finally equal zero at 360 causing IVS 1 to check if its internal real time clock has changed at 368. If it has IVS 1 schedules the next real time clock interrupt to occur at 370, clears the interrupt mask at 372, enables the real time clock interrupt at 374 and then exits the soft start mode subroutine at 376 at which point AC input voltage is fully applied to transformer 18 and to the load. Once the soft start mode is completed IVS 1 then enters the power conditioning mode.

Power Conditioning Mode

Figure 7A:
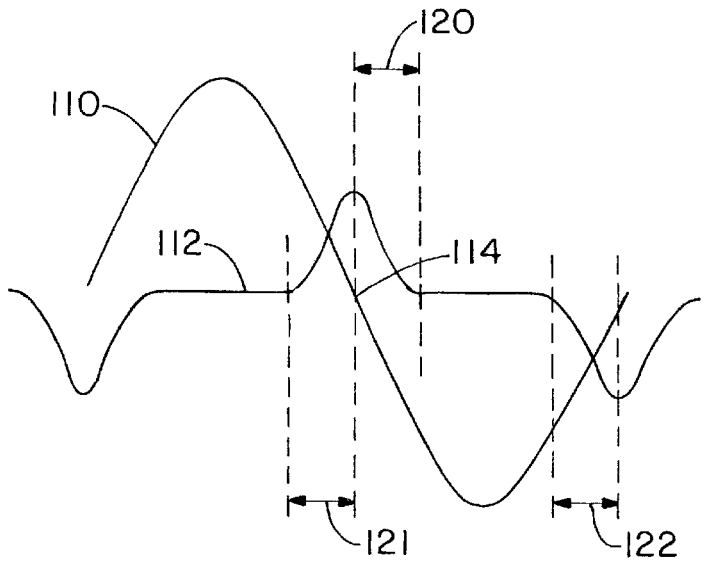
FIGS. 7a–7d show schematic graphical representations of line voltage and primary current on the transformer for different applied loads.
Figure 7B:
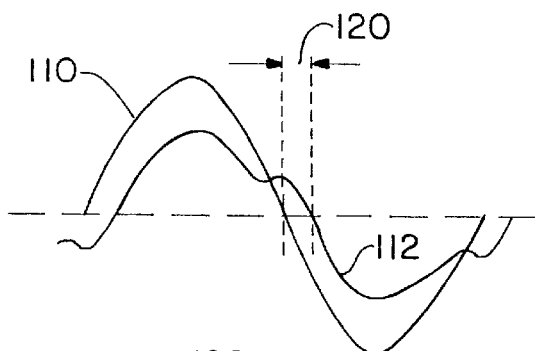
Figure 7C:
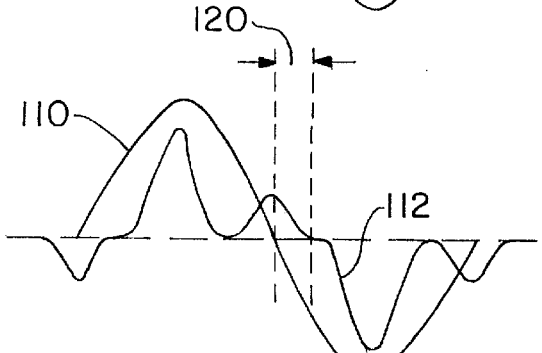
Figure 7D:
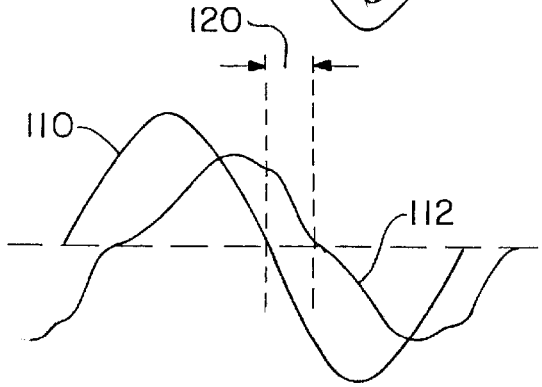

In the power conditioning mode, the IVS 1 provides a nominal output voltage which may be used in conjunction with a UPS or as a stand alone unit. In many applications, an auxiliary output port may be shared off the transformer of the IVS 1 for example to run non-critical equipment which is not UPS protected. Without UPS protection, it is desirable for the IVS 1 to operate to supply a continuous output for operation of downstream equipment while performing necessary tap changes to accommodate input variations. If output voltage were cut off for short periods of time to perform tap changes, the downstream equipment would temporarily loose power. For many applications, such as supplying power to a laser printer or other equipment, such loss of power causes the equipment to reset undesirably. To supply continuous power to the output of IVS 1 while performing tap changes, the micro controller in control unit 8 is used to determine the most appropriate interval in the power cycle of the line voltage waveform for forced commutation of current through the solid state switch which is being turned off for a tap change. The appropriate interval in the power cycle of the line voltage waveform through the IVS 1 will in part depend upon the load applied to the transformer. In FIG. 7a, the primary current of the transformer with no load is shown. The voltage waveform 110 shows a typical sinusoidal AC voltage applied to the transformer. The primary transformer current 112 varies based upon the type of the load that is connected to the output of the transformer. FIGS. 7b–7d show the corresponding primary current of the transformer with a commonly encountered load applied thereto. Most commonly encountered loads for various applications can be divided into three categories. These categories include resistive type loads and loads having power supplies with power correction factor, power supplies with nonlinear current, or inductive type loads. For resistive type loads or loads having power supplies with power factor correction, the load draws current which is almost sinusoidal and in phase with the supply voltage similarly to a resistive load. FIG. 7b shows the current waveform 112 for a load of this type. Similarly, for a load having a power supply with nonlinear current, FIG. 7c shows the current waveform 112. Such power supplies are typically used in a variety of equipment. Inductive type loads, such as transformer or motor type loads produce a current waveform as shown in FIG. 7d. Based upon the loads, the transformer primary current varies significantly, and the control unit 8 provides a switching scheme for configuring the transformer tap selection which will function properly with all the types of loads, such as shown in FIG. 7. In operation, the most appropriate interval in the power cycle is selected for forced commutation of current through the solid state relay devices being turned off in a tap change. For each of the loads depicted in FIGS. 7a–7d, the appropriate interval to effect a transformer tap change is shown at 120 for a tap change from low to high.

Figure 8:
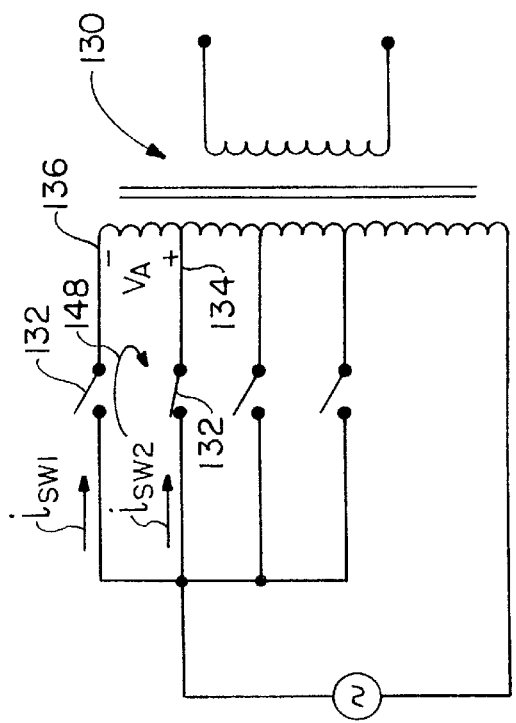
FIG. 8 is a schematic representation of a transformer tap configuration.
Figure 9:
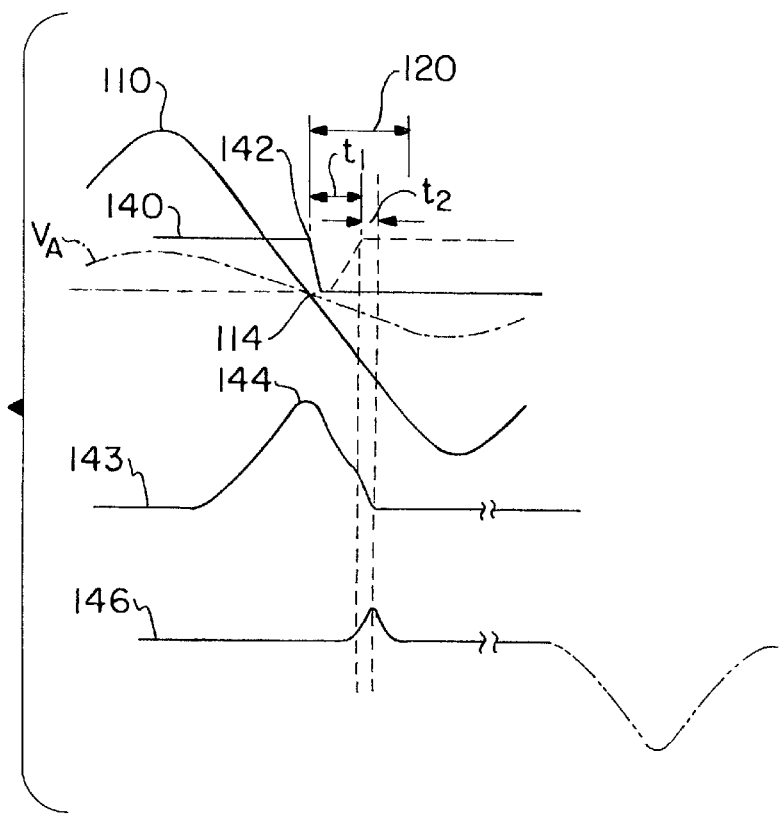
FIGS. 9 and 10 are schematic graphical representations of voltage and current waveforms showing the no-break tap change method according to the invention.

Turning to FIG. 8, as an example, a transformer configuration 130 is shown, having four tap selections associated with the primary winding. For each tap, a solid state switch 132 is provided, wherein closing of the switch will select a particular tap. In FIG. 8, a tap 134 is initially selected, and a tap change to another of the taps 136 is to be performed by controller 8. As is evident from FIG. 8, a tap change from tap 134 to tap 136 will switch from a relatively low voltage tap to a relatively high voltage tap. In operation, the control unit 8 of the present invention is used to switch off tap 134 and, at a predetermined time in the power cycle, to switch on tap 136. Upon switching off tap 134, the nature of the switches 132 is such that once the control signal closing the switch is removed, current through the switch remains until it is reduced to zero. In FIG. 9, the waveforms during a tap switching process according to the invention from a low tap to a high tap are shown. The control unit 8 functions to detect the zero crossing of the line voltage at 114 in FIG. 7a for example. From the detection of the zero crossing of the line voltage at 114, the interval 120 may be determined relative to the current waveform encountered and based upon the load coupled thereto. In FIG. 9, the line voltage 110 for a power cycle is shown. A control signal is applied to switch 132 for tap 134 at 140, until the zero crossing at 114 is detected at 142. At this time, it is noted that the current through the switch 132 associated with tap 134 on current waveform 143 is at a peak 144 and decays thereafter to zero. No current is yet applied to switch 132 associated with tap 136 at this time. The interval $t_1$ is representative of a predetermined time which elapses subsequent to turning switch 132 off for tap 134, and prior to turning on switch 132 associated with tap 136. As seen in FIG. 9, current is only applied through switch 132 associated with tap 136 during time period $t_2$ as shown in current waveform 146. In the short time interval $t_2$, both switches 132 associated with taps 134 and 136 will be conducting simultaneously. A circulating current will thus be set up in this circuit in the direction of the arrow 148 in FIG. 8 during the period $t_2$. The circulating current caused by the voltage in the section of the transformer coil between taps 134 and 136 is thus in a direction which will oppose the current through the switch 132 associated with tap 134. Thus, the circulating current will reduce the current in switch 132 associated with tap 134 to zero, at which point the circulating current loop will be open as switch 132 of tap 134 will go out of the conducting state. By the end of the interval $t_2$, the entire transformer current will then be transferred to switch 132 associated with tap 136, thereby effecting the tap change. In this method, power through transformer 130 is substantially uninterrupted, as the tap change is performed subcycle to the voltage waveform.

Figure 10:
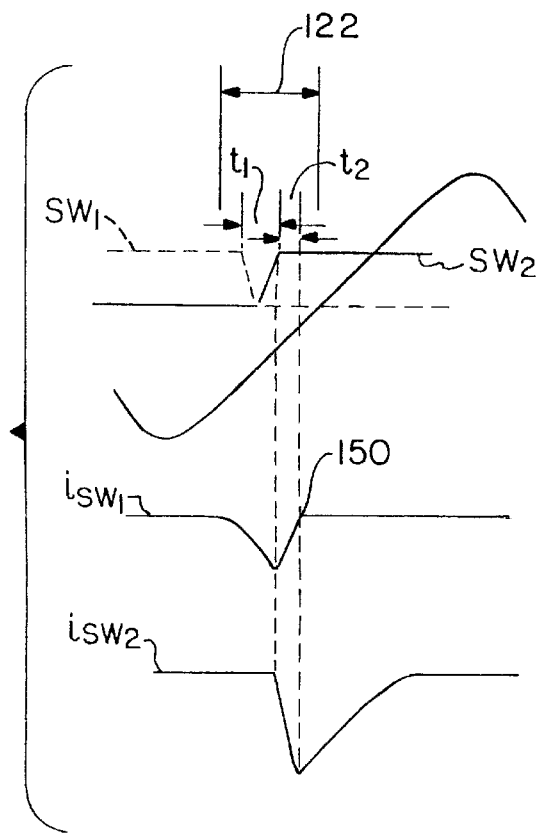

It should be noted that in this operation, if a tap change from low to high was made in any other interval on the power cycle, circulating current due to the voltage in the section of the transformer between the taps would have aided the current through the turned off switch 132, giving rise to a large short circuit current during a portion of the cycle. For example, switching taps at interval 121 of FIG. 7a will cause such a short circuit current which should be avoided. This method of changing transformer taps allows a no-break tap change, relying upon forced commutation of current through the switch 132 which is being turned off. Alternatively, as shown in FIG. 10, a tap change from a high tap to a low tap on the primary winding of transformer 130 requires a tap change during an interval 122, such as shown in FIG. 7a. In this interval, and with reference to FIG. 8, the switch 132 associated with tap 136 is deenergized in a manner similar to the tap change from low to high previously described. When changing to a lower voltage tap, the controller 8 waits until approximately 120° into the power cycle before energizing the switch 132 associated with the lower voltage tap 134. In this manner, current through switch 132 associated with tap 136 drops off for the time period $t_1$, and based upon the magnetizing current of the transformer thereafter increases in interval $t_2$ to point 150 where switch 132 of tap 136 is turned off. During time period $t_2$, switch 132 associated with the lower tap 134 is turned on, and an opposite current is produced which substantially eliminates the effect of the magnetizing current and allows the no-break tap change to be effected. The no-break tap change operation utilizes the inherent nature of current commutation capability for all of the different types of load referred to in FIGS. 7a–7d.

In an alternative preferred embodiment of operation, the natural commutation of current associated with the transformer configuration is relied upon when turning a tap switch off and selecting a different tap of the transformer. This operation may be referred to as the synchronized tap change with natural current commutation which will now be described.

Synchronized Tap Change

Under this mode of operation, the changing of transformer taps between high and low ranges is carried out using mechanical relays, such as shown at 16 in FIG. 4, along with a solid state relay unit 14. The mechanical relays are preferably used with the dual range transformer configuration, to set its primary taps for producing high and low nominal output voltages, such as 120 volts or 220 volts. After the IVS 1 has initialized and enabled it's output, the configuration or mechanical relays 16 remain in constant position for the continuation of the systems operation. Thus, the transformer configuration is set to produce a nominal output voltage according to the input voltage encountered, and does not switch between voltage windows as previously mentioned. The SSRD 14 provides the dynamic switching operations involved in connection to the power line, and in changing transformer taps in a given voltage window. Within each of the voltage windows, a number of transformer taps are available for accommodating variations on the power line. In this method of operation, the natural commutation of current through the solid state relay switch is utilized to provide a soft turn on of the transformer after a tap change, minimizing stress on solid state switches by preventing switching transients, and acting to prevent arcing between relay contacts during switching. With reference to FIG. 11, the sequence of performing a tap change will be described in more detail. The line voltage 160 is shown again to vary in a sinusoidal manner, with the line voltage being monitored by the control circuit as previously described. The transformer current 162 (with no load) shows magnetizing current peaks associated with varying voltage. In this method of operation, if a transformer tap change is required, the solid state power line switch associated with a selected tap is deenergized at the zero crossing of the power cycle at 164. As previously indicated, the solid state switch inherently will not turn off instantaneously, but continues to conduct current for a brief period thereafter, and actually turns off at point 166 after the current therethrough is reduced to zero. The conducting solid state switch can be turned off at either positive or negative zero crossing of the line voltage 160. Thereafter, no other solid state switch is turned on for at least one power cycle, during which period the conducting switch goes through a natural commutation of current as the line current changes polarity. As should be understood, when the solid state switch associated with the selected tap is initially turned off, the transformer core will be magnetized in a particular direction depending upon the polarity of the last half of the magnetizing current prior to turn off. The core of the transformer maintains a level of residual magnetism in this direction, which can create significant inrush current if another solid state switch is turned on randomly. If, as an example, the transformer is turned back on at a point of opposite polarity in the power cycle, a significant inrush current will be produced which would be higher than the quiescent draw current for the transformer. In many situations, the inrush current would be significant enough to trip circuit breakers associated with the power line. Similarly, if the transformer was simply turned off after desired use, the residual magnetization of the transformer core may cause similar inrush current to be produced upon reapplication of power to the unit. It is an object of the invention to minimize the inrush current which could be produced by the transformer upon performing tap change operations or in these other circumstances. In the method of the invention, once a solid state switch is turned off at a zero crossing 164, no other switch is turned on to effect the tap change for at least one power cycle in the line voltage 160. During this period, the conducting switch goes through a natural commutation when the line current changes polarity. Thereafter, the new tap solid state switch can be turned on at a point synchronized with the power cycle to minimize inrush current. As seen in FIG. 11, after at least one power cycle has elapsed from turning the selected tap switch off, the next zero crossing of the line voltage can be monitored via the control unit 8, allowing the second or newly selected tap switch to be turned on at a predetermined interval thereafter. In the preferred embodiment, a delay of 120° from a positive or negative zero crossing of line voltage (or a similar zero crossing point as at turn off) is incurred, and the second switch is turned on at point 168 to effect the tap change. Again in the preferred example, the new tap switch is turned on during an interval of 90° to 120° delay from the similar zero crossing point corresponding to turn off of the previously selected tap switch. This provides soft turn on of the transformer with the new tap selection, keeping the initial magnetizing current or inrush current to a minimal value. By turning the new tap switch on with the specified delay, this enables building up of magnetizing current in the reverse direction so that the core does not experience any sudden change in magnetization upon reapplication of power. There is thus no need to use inductively rated circuit breakers to handle inrush current, and therefore does not require control over circuit breakers in an application environment. This is particularly advantageous in environments where an operator does not have control over circuit breakers associated with the power line, such as in deployable environments or fixed facilities. The method of the invention actively minimizes inrush current of the transformer to allow tap change without the use of current limiting or current sensing devices, although these types of devices could be used in addition is desired. Similarly, upon power up of IVS 1, the control unit 8 will perform an initial tap selection, preferably with 120 degree delay from a zero crossing point in the line voltage, to minimize inrush current even at system initialization.

In both of the modes of operation described above, it would be desirable to avoid frequent changing of tap selections based upon transitory fluctuations on an input line of otherwise stable nominal voltage. It is therefore a feature of the invention to provide a configurable tap change delay to account for such circumstance.

Configurable Tap Change Delay

In the preferred embodiment, the placement or removal of a jumper on the control unit 8 is used to provide a time latency for changes of transformer taps, which can be set for a predetermined interval, such as between 1 to 30 seconds. In many application environments, the equipment operated downstream of the IVS 1 may intermittently create a low line condition, such as for example a laser printer being initialized. In such environments, the equipment may regularly create such conditions, and it would be preferable to eliminate a tap change for each occurrence of a regular but short duration low line level. A latency period is provided to avoid excessive or unnecessary tap change responses to such transitory fluctuations on the input voltage line. The latency period can simply be programmed by means of the control unit 8. The latency period may also be selected for any tap change, or only for particular tap changes in the transformer configuration. The latency period preferably does not effect the response characteristics of IVS 1 to under or over voltage conditions, with these safety features maintained to protect equipment operated from IVS 1. Similarly, the hardware can be configured so as not to introduce the latency delay in the tap change if desired for a particular application, or under certain conditions such as a tap change from high to low.

For the dual range transformer configuration, it may also be desirable to limit the number of tap switches based upon repeated fluctuations of line voltage which are detected. In the preferred embodiment, the control unit 8 of the IVS 1 will limit the number of tap changes to a predetermined number of occurrences within a predetermined interval of time. For example, the IVS 1 could be configured to limit the number of tap changes to three occurrences in every five minute period. Repeated fluctuations of line voltage within the period are thus effectively ignored to minimize rapid flip flopping tap changes which may be incurred otherwise. This will facilitate use of IVS 1 under soft line conditions, or with a generator where input line voltage may vary rapidly. In operation, the real time operating system firmware provided in the control unit 8 executes logic and timing functions for controlling the operation of IVS 1. The control unit operates to collect data from an analog to digital converter forming part of the control circuit, and monitoring input line voltage. In its function to monitor input line voltage, the control unit 8 may be configured to monitor and update a table of voltage measurements (such as eight values) occurring at predetermined intervals, such as at a 20 Hz. frame rate. This keeps power line measurements fresh through periodic calling of analog system routines and enables verification that the line voltage is within useable limits before taking any action. If line voltage varies to require a transformer tap change, the control unit 8 will then perform the tap change by controlling relay and switch operation.

In the preferred mode of operation, the control unit 8 will continuously monitor voltage over an eight second running average to determine whether tap changes are required. The control unit is used to measure the power line voltage against the parametric data parameters loaded from the initialization of the system, to verify that the line voltage is within a predetermined window of high and low limits, and if so, selecting a transformer tap and enabling the output of the IVS 1. As an example of operation, decisions affected by the control unit 8 may be performed based upon a real time interrupt subroutine which provides timing functions and services used by the real time tasks performed by the control unit 8. As an example of operation, the real time interrupt may provide a 50 Ms. tick (20 Hz) by a real time clock interrupt for timing execution of real time functions. A counter produces frames of a predetermined period, where a preferred example would use 20 counts per frame to produce a frame of one second. In the first 19 ticks of the frame, the main real time task updates analog input data and executes actions based upon decisions made in the previous frame. On the 20th frame, the real time task makes decisions in accord with the newly updated data and sets up any needed action to be executed within a following period. This arrangement provides a latency period of one second between a logical decision and its corresponding action, but other arrangements would be recognized by those skilled in the art and are contemplated herein. In this way, the real time interrupt can also maintain a time of day resolved to seconds, minutes and hours, and may also service three timing counters used for limiting transformer tap changes in the dual range transformer configuration mode. Further, a total system run time count can be kept in a non-volatile FEPROM or the like, which is incremented by the real time interrupt routine every hour.

The real time interrupt routine also preferably provides four basic "system" services, including the capture and storage of nine values of the counter at successive positive zero crossings of the power line cycle. These values are used in computing power line frequency in the initialization process. The system services may also include setting a flag bit at the zero crossing of the power line cycle, for synchronization with the power cycle for timing solid state relay switching in the no-break tap change operational mode. Similarly, the synchronous zero crossing engagement and disengagement of designated solid state relays are performed for the synchronized tap change mode of operation.

Figure 12A:
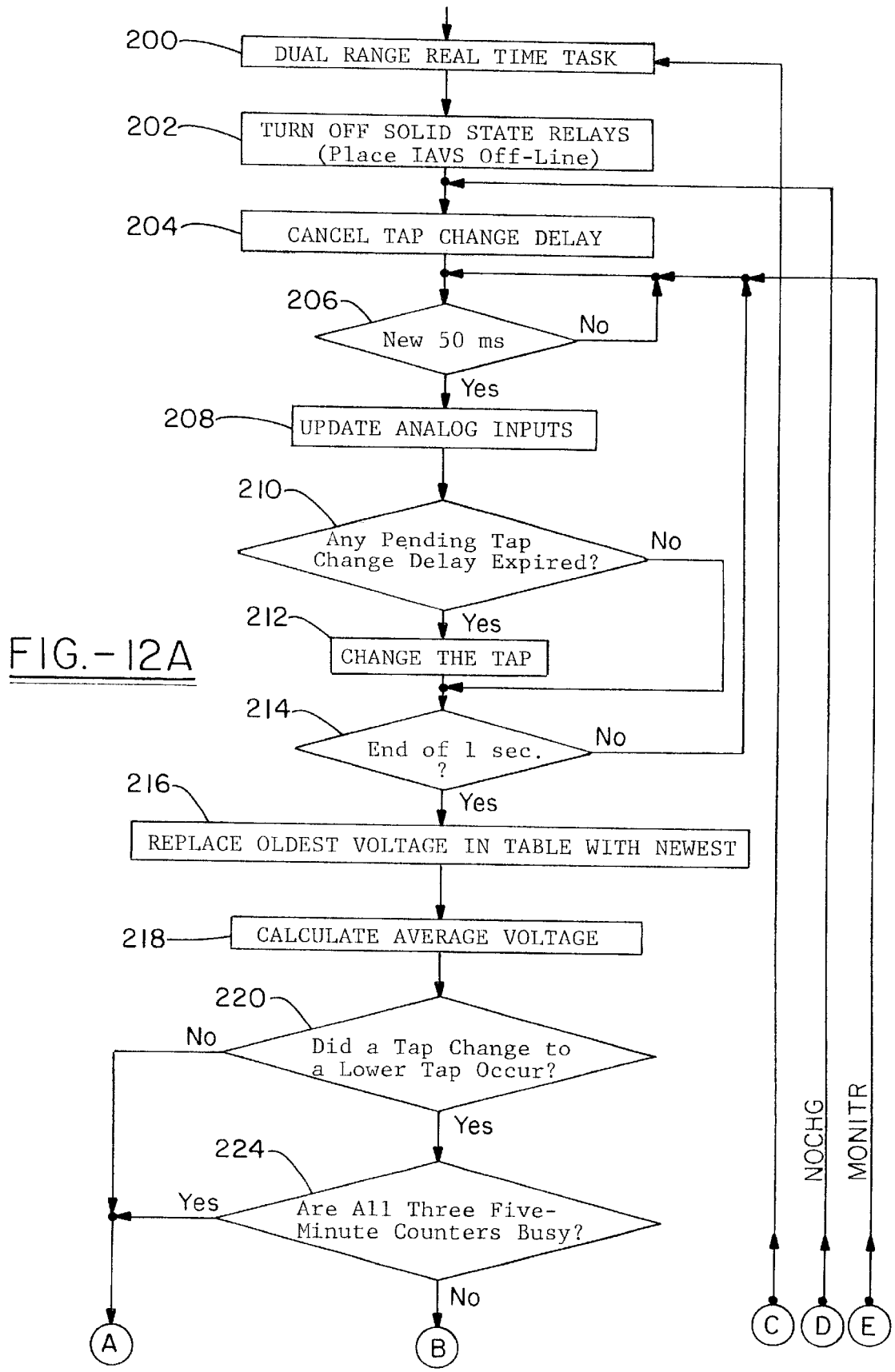
FIG. 12 is a flow diagram showing operation of the apparatus by the control system for a dual range transformer configuration.
Figure 12B:
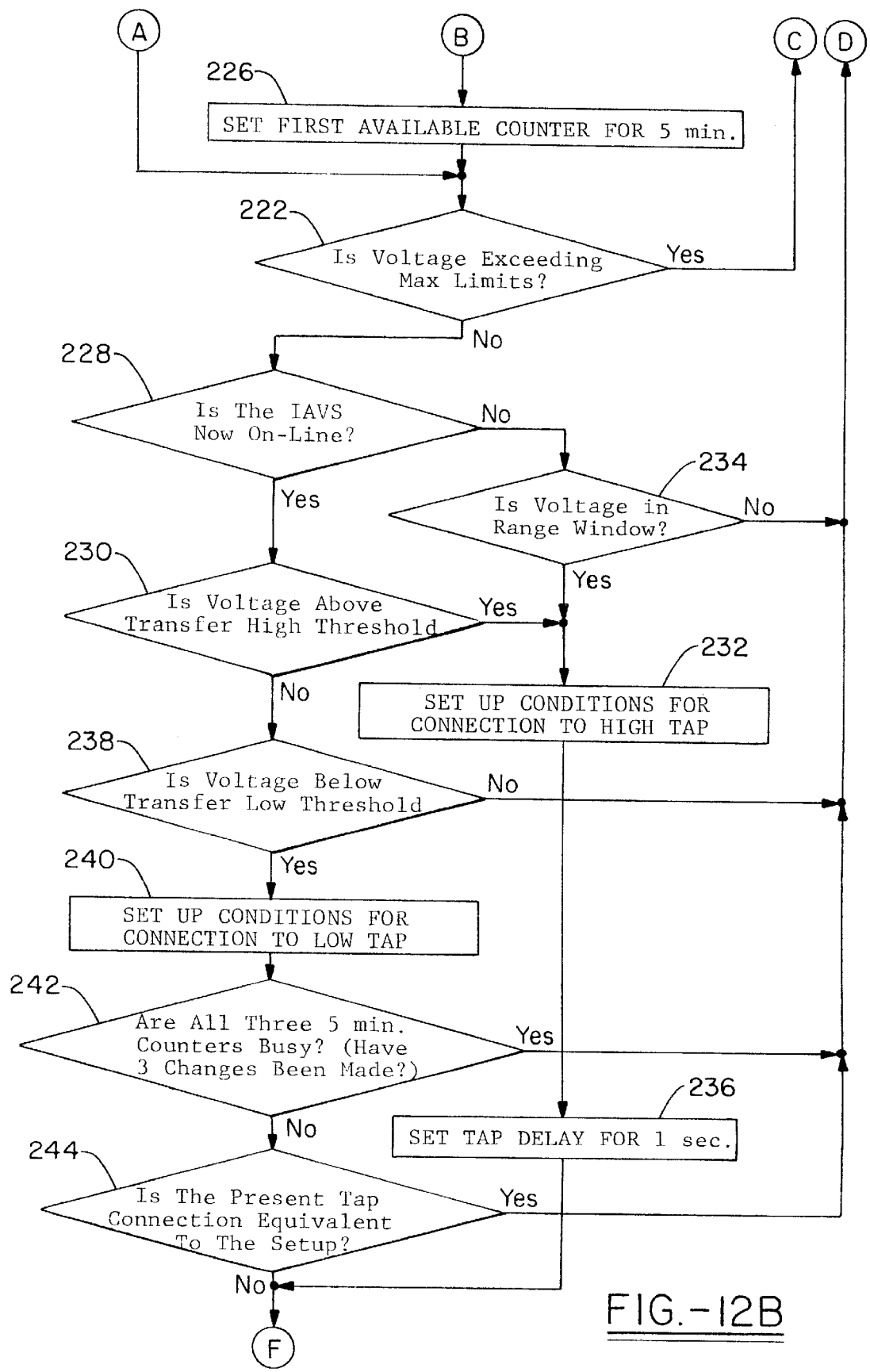
Figure 12C:
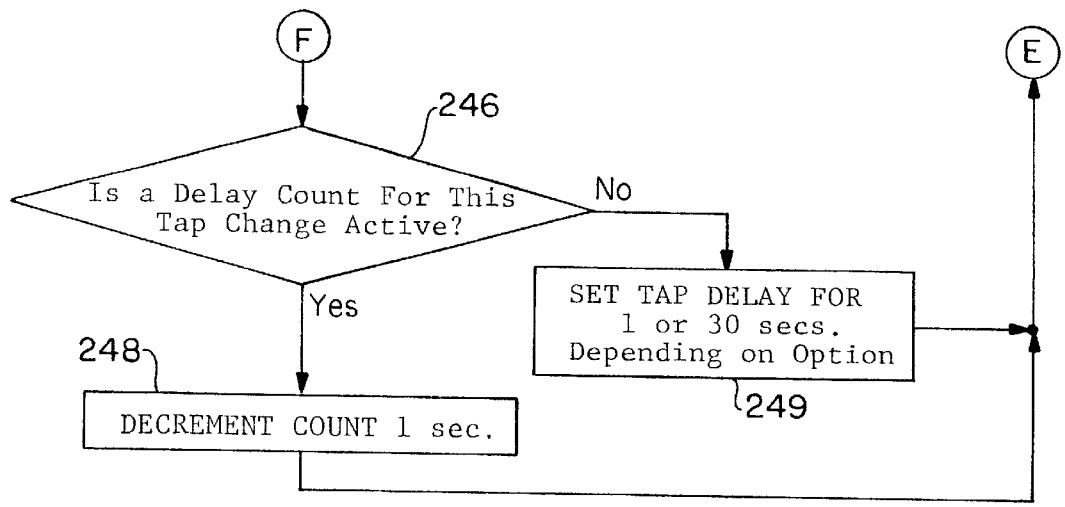
Figure 13A:
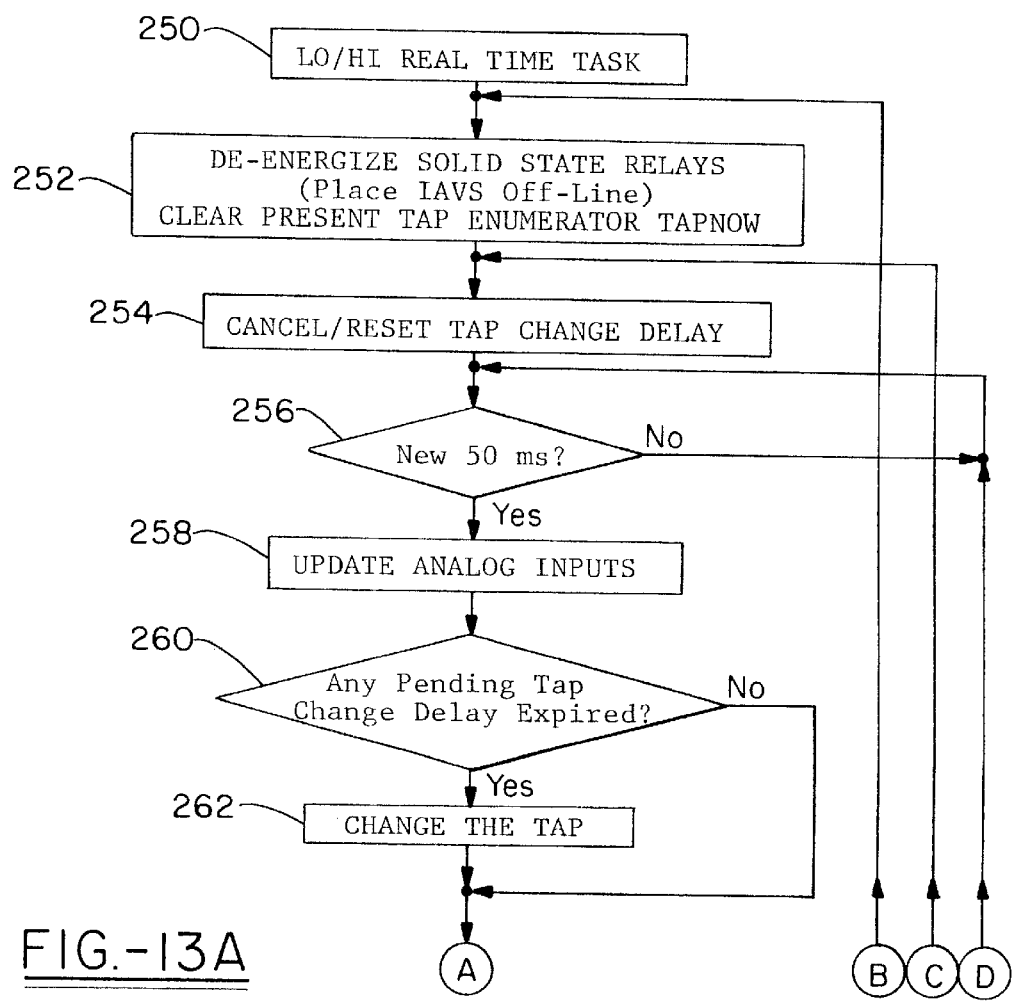
FIG. 13 is a flow diagram showing operation of the apparatus by the control system for a LO/HI transformer configuration.
Figure 13B:
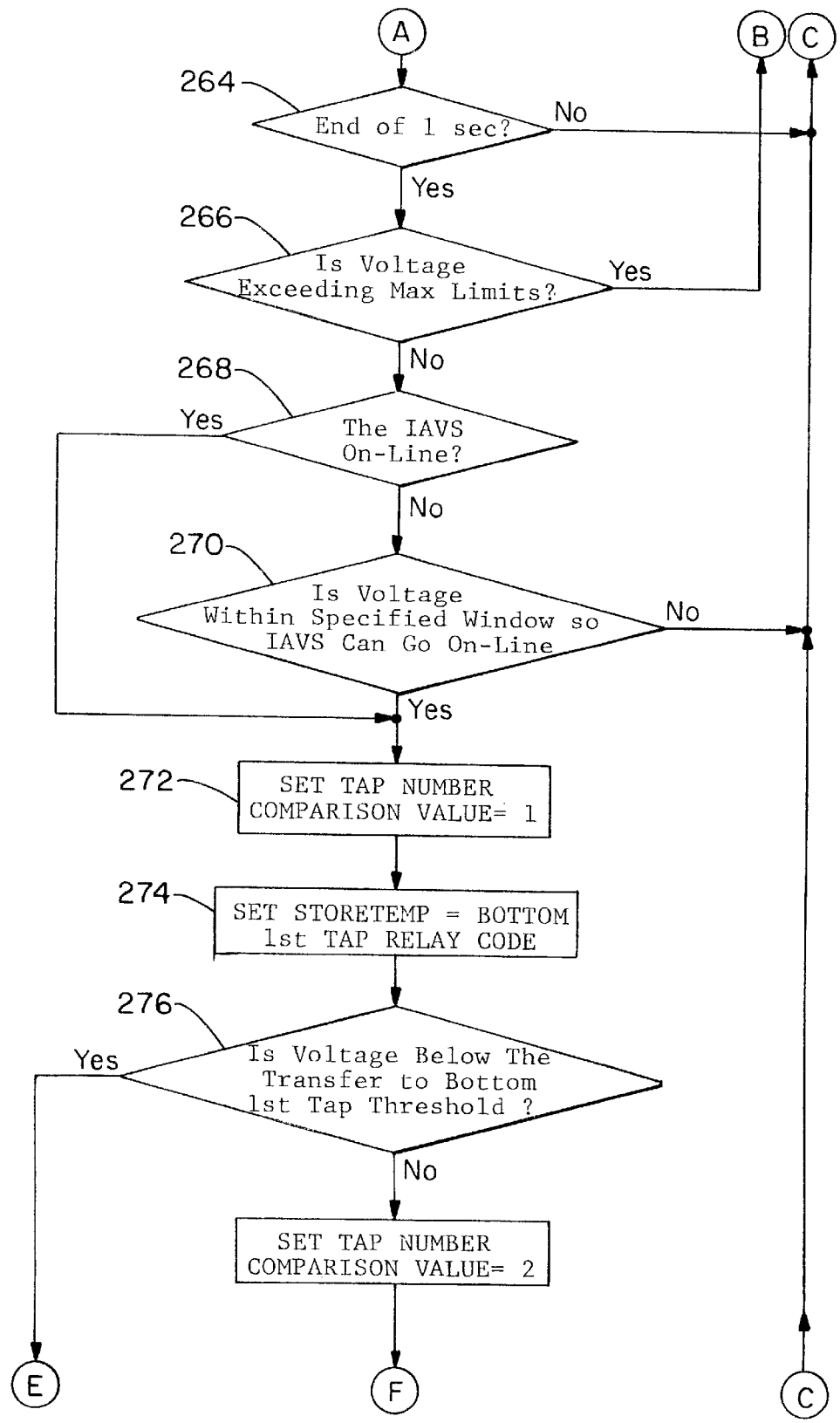
Figure 13C:
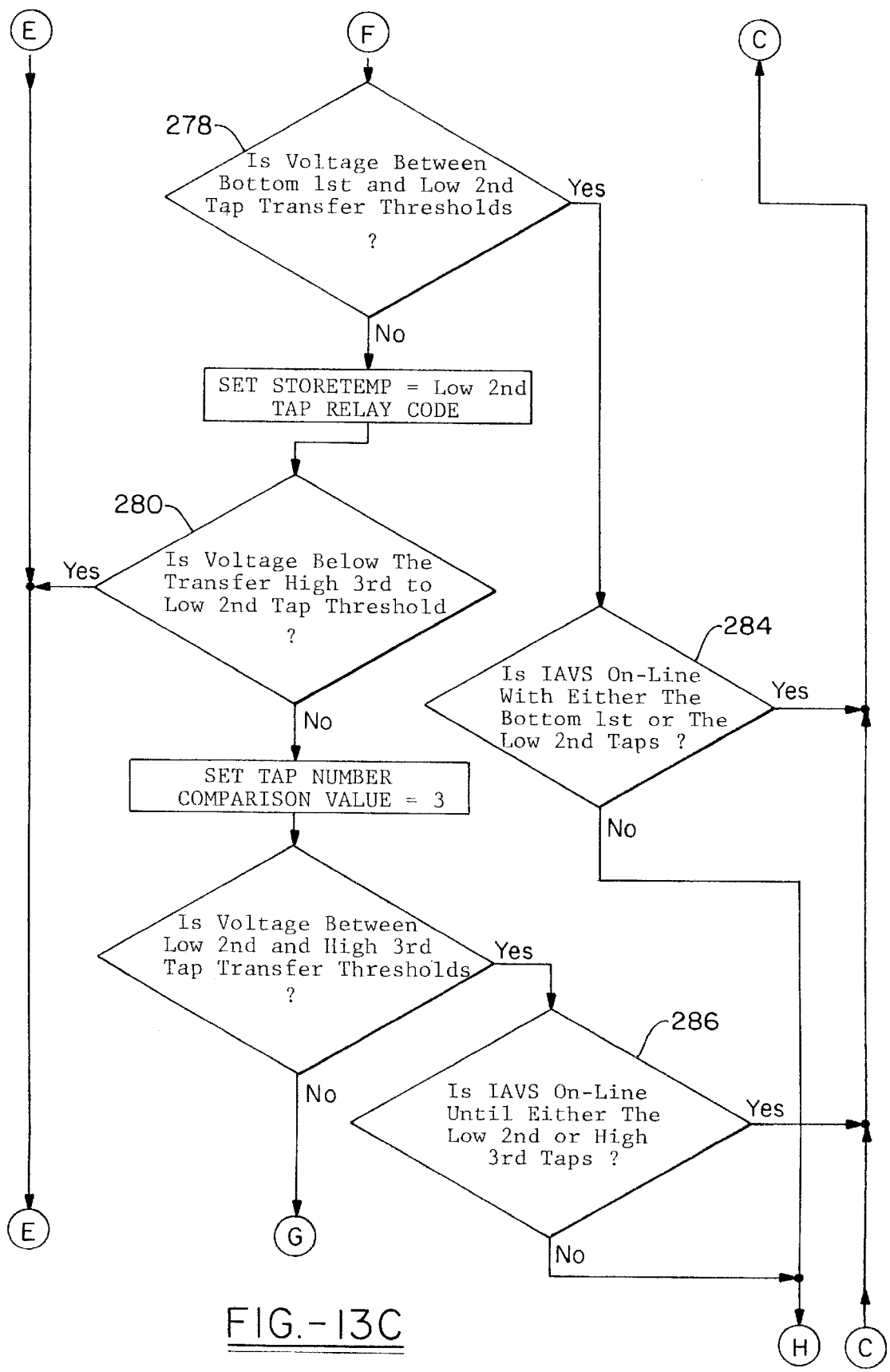
Figure 13D:
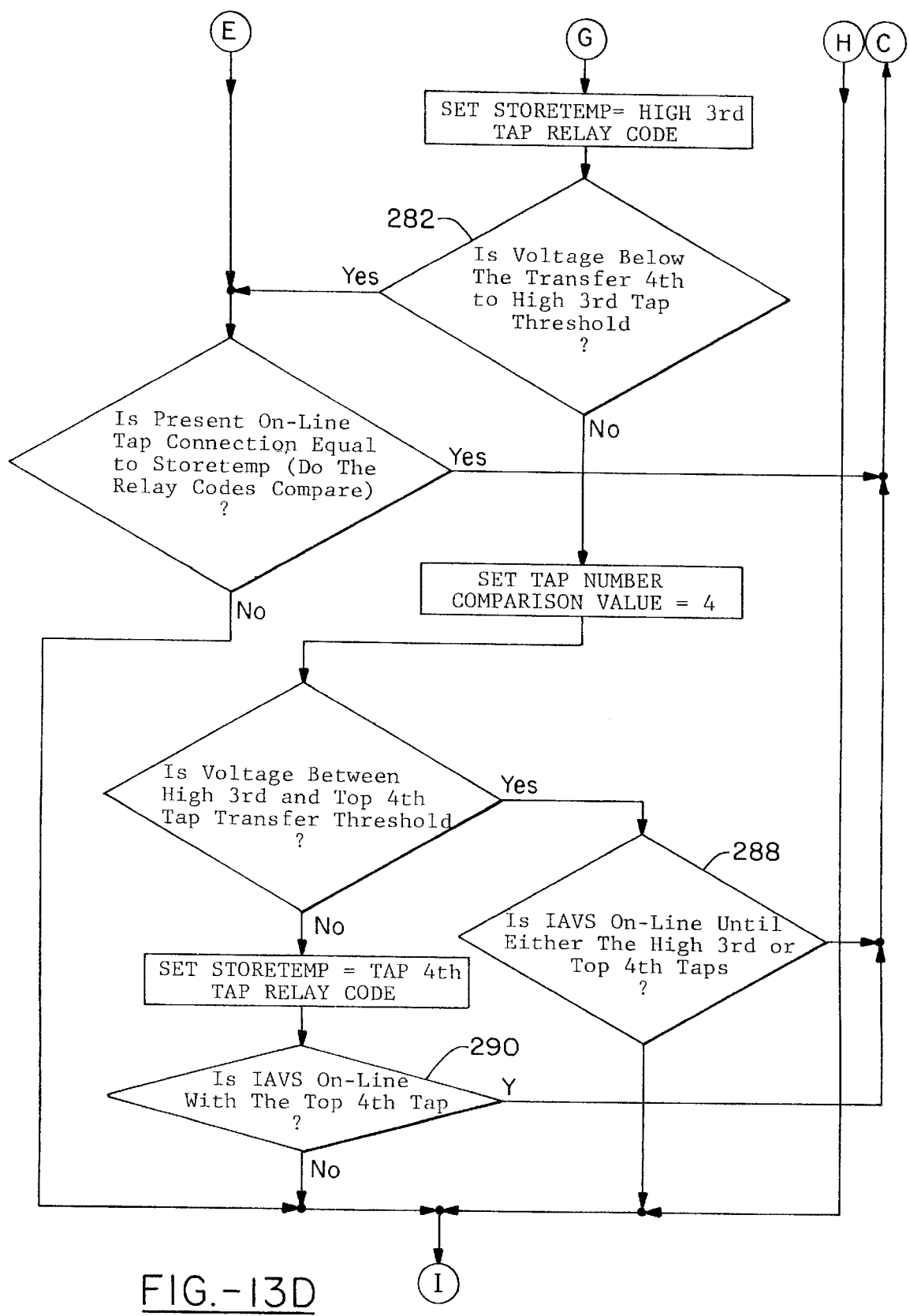
Figure 13E:
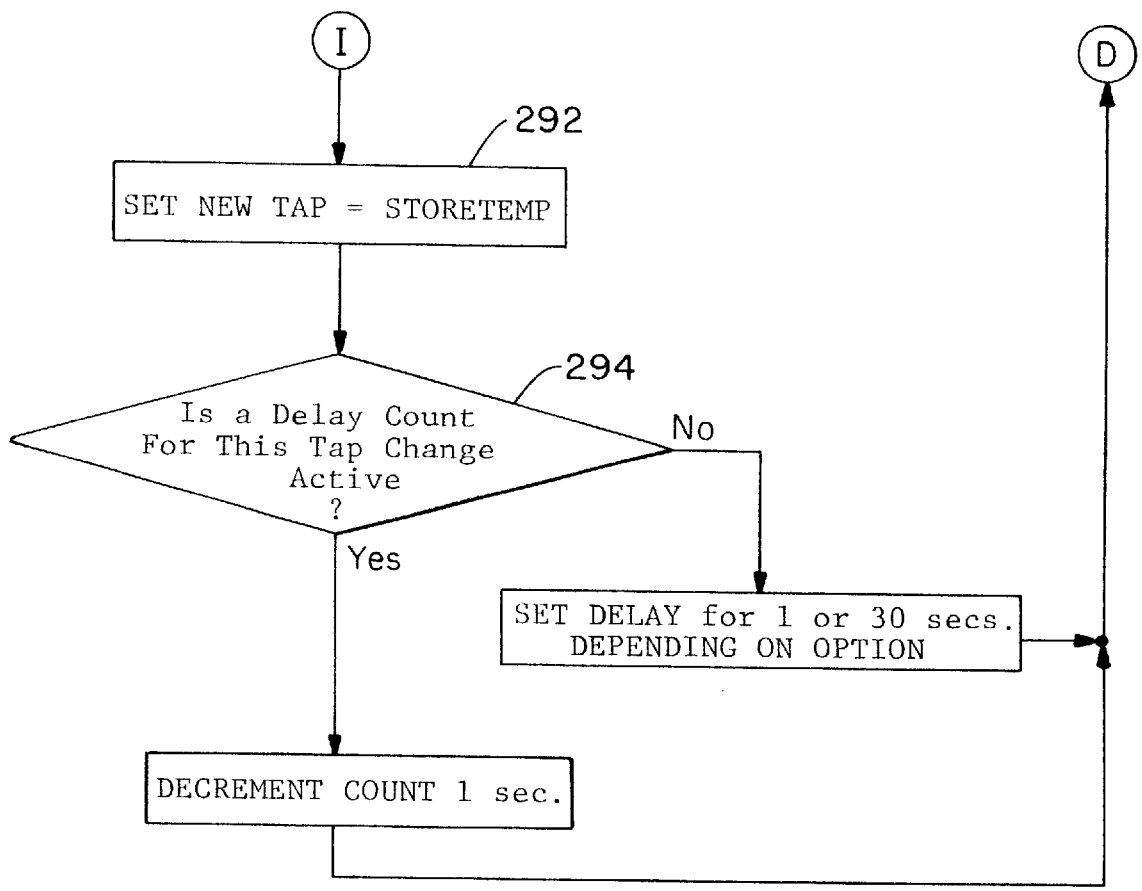

Referring back to FIG. 6, for the dual range transformer configuration, after initialization, the real time task is implemented as shown in FIG. 12. The dual range real time task 200 begins by placing IVS 1 off line or turning off the solid state relays at 202. Thereafter, any tap change delay is cleared at 204, and the system determines whether a new tick of the real time clock has been received at 206. For each tick, analog inputs are updated at 208 to continuously monitor line voltage. If the micro controller or control unit 8 is configured to delay tap changes within an interval, the firmware determines whether a pending tap change delay has expired at 210, and if so will effect a tap change if required at 212. Based upon the real time clock interrupt and timing cycle, once a frame of operation expires at 214, stored voltage measurements are replaced in memory at 216, and the control unit 8 calculates an average voltage at 218. Thereafter, the control unit determine whether a tap change to a lower tap occurred at 220, and if not goes on to determines whether the input line voltage is within predetermined limits at 222. If a tap change did occur at step 220, the interval in which a maximum number of tap changes is limited is interrogated at 224, which in the preferred embodiment comprise three five minute counters which provide a sliding five minute time window in which tap changes will be limited. If one of the counters is not busy, it will be set based upon a tap change at 226. Tap changes will thus be limited to a maximum value within the sliding window provided. Thereafter, it is determined whether the IVS is online at 228, and based upon the updated voltage measurements, it is determined whether a tap change is required. If the IVS is online, it is determined whether the measured voltage is above the transfer high threshold of the transformer tap configuration at 230, and if so conditions are set up for connection to the high tap of the transformer at 232. If the IVS is offline at step 228, step 234 determines whether the measured voltage is within the range window, and if so sets up conditions for connection to the high tap at 232. Thereafter, a tap delay is set for a frame (1 sec. in the example) set by the real time clock interrupt at 236, for continued processing. If the determination of voltage at 230 is not above the transfer high threshold, it is then determined if the voltage is below the transfer low threshold at 238 and if so conditions are set up for connection to the low tap at 240. Again, the function to limit the number of tap changes within a sliding window is determined at 242, wherein if a predetermined number of tap changes has occurred within the selected window, no further tap change will be allowed. If not, step 244 determines whether a tap change is required based upon the newly measured voltage, and thereafter determines whether the control unit 8 has been configured with a tap delay option at 246. If the tap change delay option has been selected, and has not expired, the count is decremented one frame at 248 and the process repeats for the next frame until the set tap delay has expired. Alternatively, if the tap delay option has been selected and has expired, it may be reset at 249. In the preferred embodiment, the optional setting of a tap delay is provided for tap changes from high tap to low tap which will be initiated only when a low line condition is detected for a predetermined period of time. Such a delay could be introduced in other tap changes if desired.

Alternatively, if the high/low range transformer configuration is utilized, the low/high real time task shown in FIG. 13 at 250. Again, the task is initiated by deenergizing the solid state relays to place the IVS offline at 252 and clears the present tap enumerator. The tap change delay is reset at 254, and upon a new tick of a frame at 256, the analog inputs are updated at 258. It is thereafter determined whether any tap change delay has expired at 260 and if so a tap change is effected at 262 if required. After the end of a frame at 264, a renewed voltage measurement is taken to determine whether it exceeds maximum limits at 266. If the voltage is within the maximum limits and the IVS is not online as determined at 268, a determination of whether the measured voltage is within a specified window is made to allow the IVS to go online at 270. Thereafter, the real time task performs a comparison of the measured voltage to determine if a tap change is necessary, with the steps of setting a tap number comparison value at 272 and tap relay codes at 274 to compare the measured voltage at 276. This series of steps is performed for each of the tap parameters being the bottom voltage threshold at 276, the low tap transfer threshold at 278, the high tap transfer threshold at 280, and the high tap threshold at 282. For each of these determinations, if the voltage is between the parameter thresholds set by the transformer configuration, it is thereafter determined whether the IVS is online at the required tap setting at steps 284, 286, 288 and 290 for each of the voltage ranges between the selected parameters. If the selected tap does not comport with the measured voltage, and a new tap selection is required, the new tap is selected at 292 and thereafter it is determined whether the delay count for the tap change is active at 294 in a manner similar to that described with respect to steps 246, 248 and 249 of the dual range real time task shown in FIG. 12. Each of the real time tasks perform similar functions of keeping power line measurements fresh, verifying line voltage is within useable limits before taking any action and changing transformer taps when input voltage crosses a voltage threshold. Optionally, transformer tap changes can be delayed by a predetermined interval. In the dual range transformer configuration, tap changes may be limited to a predetermined number within a sliding window as described.

It should be apparent from the foregoing, that the voltage selection apparatus and its methods of operation provide distinct advantages in autoconfiguring or providing power conditioning in association with a power line. A selected nominal output voltage is supplied regardless of variations in input voltage, with tap changes of a transformer controlled to optimize operational parameters. In methods of operation, including the no-break tap change with forced commutation as well as the synchronized tap change with natural current commutation provide distinct advantages for a variety of applications, both in the deployable and fixed site environments. Although preferred embodiments of the invention have been described herein, various changes or modifications are contemplated with in the invention and would be apparent to those skilled in the art. The invention is therefore not to be limited to the preferred embodiment, but only according to the appended claims.

What is claimed is:

1. A method of gradually supplying an electrical load with an AC input voltage to reduce current inrush, comprising the steps of:

a. detecting a zero crossing of said AC input voltage;

b. preventing application of said AC input voltage to said electrical load for a predetermined length of time;

c. supplying said AC input voltage to said electrical load at a predetermined angle of conduction; and d. repeating steps (a) through (c) so that with each iteration of said steps the length of time in which AC input voltage is prevented from being applied to said electrical load varies while the angle of conduction in which AC input voltage is supplied to said electrical load varies, which increases the time said AC input voltage is supplied, until said AC input voltage is fully applied to said electrical load.

2. The method recited in claim 1, wherein said angle of conduction has an initial value of approximately 138 degrees.

3. The method recited in claim 1, wherein said angle of conduction varies by approximately 17 degrees with each iteration of steps (a) through (c).

4. A method of reducing inrush current when initially supplying an electrical load with an AC input voltage, comprising the steps of:

a. determining the frequency of said AC input voltage;
   b. dividing each half cycle of said AC input voltage into a predetermined number of partial cycles;
   c. detecting a zero crossing of said AC input voltage;
   d. preventing application of said AC input voltage to said electrical load for a predetermined number of said partial cycles;
   e. supplying said AC input voltage to said electrical load for a predetermined number of said partial cycles; and
   f. repeating steps (b) through (e) so that with each iteration of said steps the number of partial cycles which AC input voltage is prevented from being applied tosaid electrical load decreases while the number of partial cycles in which AC input voltage is supplied to said electrical load increases until said AC input voltage is fully applied to said electrical load.

5. The method recited in claim 4, wherein each of said predetermined number of partial cycles are equal to approximately 17 degrees of said AC input voltage half cycle.

6. The method recited in claim 1, wherein said initial number of partial cycles which AC input voltage is prevented from being applied to said electrical load is equal to eight partial cycles.

7. The method recited in claim 4, wherein said initial number of partial cycles which AC input voltage is prevented from being applied to said electrical load is equal to eight partial cycles.

8. A method of reducing initial current inrush to an electrical load, comprising the steps of:

a. determining the frequency of an AC input voltage;
   b. dividing each half cycle of said AC input voltage into equal steps of time;
   c. detecting the zero crossing of said AC input voltage;
   d. waiting until the Nth step of time is reached after said zero crossing of said AC input voltage;
   e. supplying AC input voltage to said electrical load for a predetermined length of time;
   f. removing AC input voltage from said electrical load; and
   g. repeating steps (c) through (f) with step (d) waiting until the Nth-1 step of time after said zero crossing of said AC input voltage is detected until said AC input voltage is fully applied to said electrical load when N is equal to zero.

9. The method recited in claim 8, wherein N is initially equal to eight steps of time after said zero crossing of said AC input voltage is detected.

10. A method of reducing initial current inrush to an electrical load, comprising the steps of:

a. determining the frequency of an AC input voltage;
    b. dividing each half cycle of said AC input voltage into steps of time each equivalent to approximately 17 degrees of said AC input voltage half cycle;
    c. detecting the positive going zero crossing of said AC input voltage;
    d. waiting until the eighth step of time is reached after said zero crossing of said AC input voltage;
    e. supplying AC input voltage to said electrical load for a predetermined length of time;
    f. removing AC input voltage from said electrical load; and
    g. repeating steps (c) through (f) with step (c) alternating between detecting the positive going zero crossing and the negative going zero crossing of said AC input voltage and step (d) waiting one step of time less with each iteration of steps (c) through (f) after said zero crossing is detected until said AC input voltage is fully applied to said electrical load.

11. The method recited in claim 10, wherein said eighth step of time is equivalent to an angle of conduction of approximately 138 degrees.

12. A voltage selection apparatus providing a nominal output voltage comprising, an input for receiving alternating current from a power source, a transformer to produce an output voltage coupled to said alternating current and having at least one winding and a predetermined plurality of winding taps, a voltage detector coupled between said input and said transformer to selectively measure the input voltage of said alternating current and enable output of a selected nominal output voltage, a control circuit coupled to said voltage detector, said control circuit monitoring said input voltage and producing control signals in response thereto, a plurality of electronic switches, each being coupled in series with one of said winding taps, said electronic switches being controlled by said control circuit to select a predetermined winding tap to produce an output from said transformer within a desired nominal voltage range, wherein said control circuit initially supplies an electrical load with an AC input voltage gradually over a period of time.

13. The voltage selection apparatus of claim 12, wherein, said control circuit includes a programmable processing device which is responsive to said input voltage measured by said voltage detector to generate said control signals.

14. The voltage selection apparatus of claim 12, wherein, said voltage detector provides an indication of the frequency of said input voltage, with said control circuit monitoring said frequency to determine whether the frequency of said input voltage is within a predetermined range to enable operation of the apparatus.

15. The voltage selection apparatus of claim 12, wherein said control circuit is used to determine the most appropriate interval in the power cycle of said input voltage for performing a tap change in conjunction with said transformer by means of said electronic switches, wherein said electronic switches are switched on or off, with said control circuit performing a tap change by switching off a first of said electronic switches and thereafter switching on a second of said electronic switches to effect a tap change, with said second electronic switch being switched on at a predetermined time in the power cycle of said input voltage.

16. The voltage selection apparatus of claim 15, wherein, said control circuit functions to detect a zero crossing point of said input voltage, and thereafter turns on said second electronic switch at a predetermined interval relative to said zero crossing of said input voltage.

* * * * *